(12) United States Patent
Jung et al.

(10) Patent No.: US 11,057,360 B2
(45) Date of Patent: Jul. 6, 2021

(54) ELECTRONIC DEVICE PERFORMING RECONNECTION OF SHORT-RANGE COMMUNICATION AND METHOD FOR OPERATING THE SAME

(71) Applicant: Samsung Electronics Co., Ltd., Suwon-si (KR)

(72) Inventors: Bu-Seop Jung, Suwon-si (KR); Hye-Jung Bang, Seoul (KR); Doo-Suk Kang, Suwon-si (KR); Min-Jung Kim, Hwaseong-si (KR); Bo-Kun Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 374 days.

(21) Appl. No.: 16/132,987

(22) Filed: Sep. 17, 2018

(65) Prior Publication Data
US 2019/0089686 A1 Mar. 21, 2019

(30) Foreign Application Priority Data
Sep. 20, 2017 (KR) .................... 10-2017-0121196

(51) Int. Cl.
| | |
|---|---|
| *H04L 29/06* | (2006.01) |
| *H04W 76/14* | (2018.01) |
| *H04L 29/08* | (2006.01) |
| *H04W 8/00* | (2009.01) |
| *H04W 12/50* | (2021.01) |

(Continued)

(52) U.S. Cl.
CPC .......... *H04L 63/061* (2013.01); *H04L 63/065* (2013.01); *H04L 63/083* (2013.01); *H04L 67/104* (2013.01); *H04W 8/005* (2013.01); *H04W 12/0431* (2021.01); *H04W 12/50* (2021.01); *H04W 76/14* (2018.02); *H04W 84/12* (2013.01)

(58) Field of Classification Search
CPC ... H04L 63/061; H04L 63/083; H04L 63/065; H04L 67/104; H04W 12/003; H04W 12/04031; H04W 8/005; H04W 76/14; H04W 84/12
See application file for complete search history.

(56) References Cited

U.S. PATENT DOCUMENTS

| | | |
|---|---|---|
| 9,445,449 B2 | 9/2016 | Dees et al. |
| 9,510,163 B2 | 11/2016 | Jung |

(Continued)

*Primary Examiner* — Nelson S. Giddins
(74) *Attorney, Agent, or Firm* — Jefferson IP Law, LLP

(57) ABSTRACT

An electronic device is provided. The electronic device includes at least one wireless communication circuit, a processor, and a memory. The memory stores instructions to enable the processor to, during first P2P wireless communication with a first external electronic device, enable the electronic device to operate as at least one of a host or a client, store first information about a role of the electronic device one of the host or the client, during second P2P wireless communication with the first external electronic device after the first P2P wireless communication, determine whether the first external electronic device was previously in a group, exchange second information with the first external electronic device based on a status of at least one of the electronic device or the first external electronic device, and select the role of the electronic device as the host or the client based on the second information.

16 Claims, 17 Drawing Sheets

(51) Int. Cl.
*H04W 12/0431* (2021.01)
*H04W 84/12* (2009.01)

(56) References Cited

U.S. PATENT DOCUMENTS

| | | | |
|---|---|---|---|
| 9,565,708 B2 | 2/2017 | Hassan et al. | |
| 2013/0252656 A1* | 9/2013 | Lee | H04W 76/14 |
| | | | 455/519 |
| 2014/0348061 A1* | 11/2014 | Salkintzis | H04W 4/80 |
| | | | 370/328 |
| 2015/0334749 A1* | 11/2015 | Goto | H04W 76/14 |
| | | | 370/254 |
| 2016/0127950 A1* | 5/2016 | Gupta | H04W 48/16 |
| | | | 370/255 |
| 2016/0173586 A1 | 6/2016 | McCann et al. | |
| 2017/0085638 A1 | 3/2017 | Lee et al. | |
| 2018/0176113 A1* | 6/2018 | Thota | H04N 21/2407 |

\* cited by examiner

ELECTRONIC DEVICE PERFORMING RECONNECTION OF SHORT-RANGE COMMUNICATION AND METHOD FOR OPERATING THE SAME

CROSS-REFERENCE TO RELATED APPLICATION(S)

This application is based on and claims priority under 35 U.S.C. § 119(a) of a Korean patent application number 10-2017-0121196, filed on Sep. 20, 2017, in the Korean Intellectual Property Office, the disclosure of which is incorporated by reference herein in its entirety.

BACKGROUND

1. Field

The disclosure relates to electronic devices performing reconnection of short-range communication and methods for operating the same.

2. Description of Related Art

There are electronic devices, systems, and methods for short-range communication connection. Among short-range communication schemes, Wi-Fi direct (or Wi-Fi peer-to-peer) is a technique that may establish a direct connection between Wi-Fi electronic devices using a Wi-Fi interface without passing through an access point (AP) which is an infrastructure network medium. Electronic devices connected together via Wi-Fi direct may be called a P2P group or communication group. One electronic device in a P2P group may operate as a group owner, and the others operate as group clients.

An electronic device using Wi-Fi direct may store information about prior electronic devices connected. The electronic device may receive a request for reconnection to an external electronic device after the prior connection has been released. In this case, the electronic device may achieve reconnection using the stored information about the external electronic device, skipping a process for receiving again information. This enables relatively rapid reconnection.

An electronic device using Wi-Fi direct may play a role as set in its prior communication group (e.g., as a group owner or group client) during the course of reconnection using prior stored information about external electronic devices. However, the electronic device, which used to operate as, e.g., a group client, may be required to operate as a group owner depending on a change in environment (e.g., whether an AP connects or whether it is a Wi-Fi serial bus host). This leads to the need for an electronic device capable of determining a new role in its communication group upon performing reconnection to a particular external electronic device and a method for operating the electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for operating the electronic device that may determine a new role while reconnecting to an external electronic device with which the electronic device used to connect and perform the reconnection based on at least the new role and prior stored information.

Additional aspects will be set forth in part in the description which follows and, in part, will be apparent from the description, or may be learned by practice of the presented embodiments.

In accordance with an aspect of the disclosure, an electronic device is provided. The electronic device includes at least one wireless communication circuit configured to provide wireless communication based on an infrastructure communication protocol and a peer-to-peer (P2P) communication protocol, at least one processor electrically connected with the at least one wireless communication circuit, and a memory electrically connected to the at least one processor. The memory stores instructions executed to enable the processor to, during first P2P wireless communication with a first external electronic device which allows the electronic device and the first external electronic device to form a group, enable the electronic device to operate as at least one of a host or a client, store, in the memory, first information about a role of the electronic device as at least one of the host or the client, during second P2P wireless communication with the first external electronic device after the first P2P wireless communication, determine whether the first external electronic device used to be in the group, exchange second information with the first external electronic device based on at least part of a status of at least one of the electronic device or the first external electronic device, and select the role of the electronic device as the host or the client based on at least part of the second information.

In accordance with another aspect of the disclosure, an electronic device is provided. The electronic device includes a wireless communication circuit, at least one processor electrically connected with the wireless communication circuit, and a memory electrically connected with the at least one processor. The memory stores instructions executed to enable the processor to receive, through the wireless communication circuit, a request for connection to a first external electronic device among at least one external electronic device discovered, when information about the first external electronic device received during a prior connection to the first external electronic device is determined to be stored in the memory, transmit first information for determining a role of the electronic device in a communication group formed between the electronic device and the first external electronic device through the wireless communication circuit to the first external electronic device, receive second information for determining a role of the first external electronic device in the communication group through the wireless communication circuit, determine the role of the electronic device based on at least one of the first information or the second information, and reconnect to the first external electronic device through the wireless communication circuit based on at least the determined role and the stored information about the first external electronic device.

In accordance with another aspect of the disclosure, an electronic device is provided. The electronic device includes a wireless communication circuit, at least one processor electrically connected with the communication circuit, and a memory electrically connected to the at least one processor, wherein the memory may store instructions executed to enable the at least one processor to receive, through the wireless communication circuit, a request for connection to a first external electronic device among at least one external electronic device discovered, transmit first information for determining a role of the electronic device in a communication group formed between the electronic device and the first external electronic device through the wireless communication circuit to the first external electronic device, receive second information for determining a role of the first external electronic device in the communication group through the wireless communication circuit, determine the role of the electronic device based on at least one of the first information or the second information, connect to the first external electronic device through the wireless communication circuit based on at least the determined role, upon detecting a variation in the first information while in connection with the first external electronic device, transmit the varied first information through the wireless communication circuit, receive the second information, which is varied or maintained, from the first external electronic device, re-determine the role of the electronic device based on at least one of the varied first information or the varied second information, and operate the electronic device based on at least the re-determined role.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
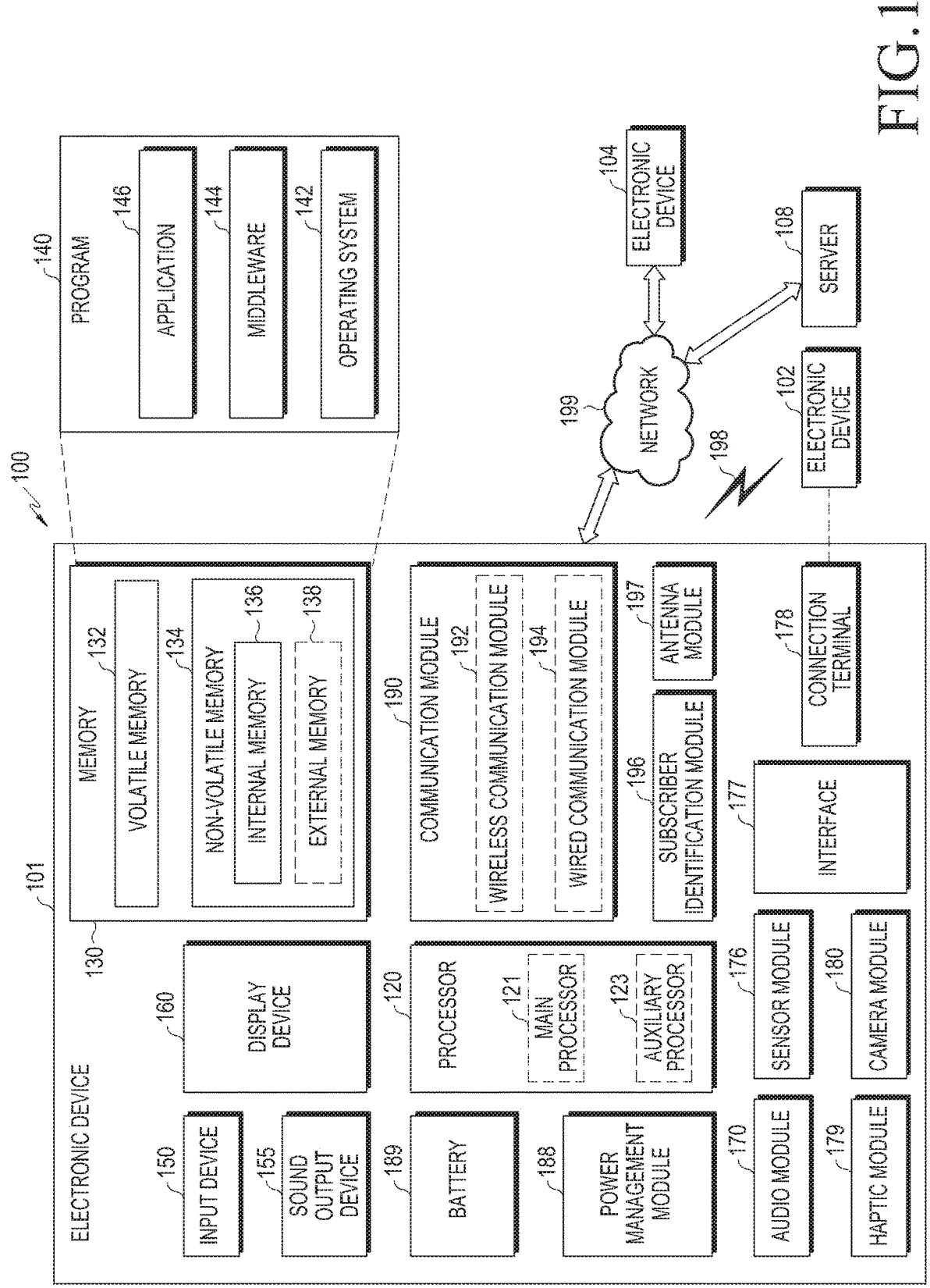
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as Bluetooth (BT), wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device receiving the request may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
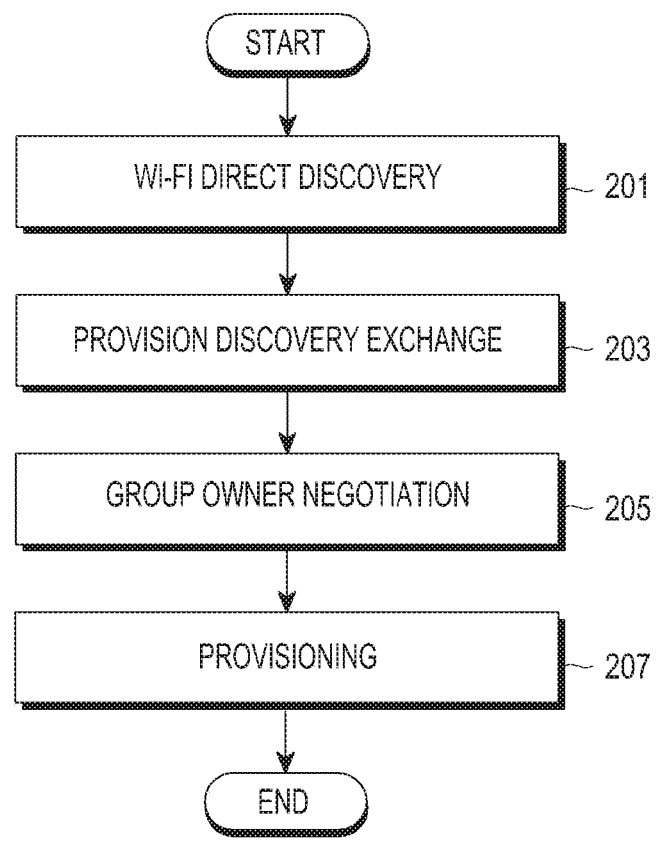
FIG. 2 is a flowchart illustrating a Wi-Fi direct connection process according to an embodiment of the disclosure.

FIG. 2 is a flowchart illustrating a Wi-Fi direct connection process according to an embodiment of the disclosure.

Referring to FIG. 2, in operation 201, an electronic device 101 (e.g., the processor 120) may perform Wi-Fi direct discovery through, e.g., the communication module 190. For example, the processor 120 may perform discovery for an external electronic device by transmitting a designated communication signal through the communication module 190 and scanning a communication signal received corresponding to the transmission. As described in connection with FIG. 1, the electronic device 101 may perform communication with an external electronic device (e.g., the electronic device 102) through a first network 198, e.g., a Wi-Fi direct network. Hereinafter, the electronic device 102 performing communication using Wi-Fi direct is referred to as an external electronic device 102. The electronic device 101 may scan a communication signal received from the external electronic device 102, thus discovering the external electronic device 102. As used herein, "electronic device 101 performs a particular operation" may be appreciated as the processor 120 performing the particular operation. As used herein, "electronic device 101 performs a particular operation" may also be appreciated as the processor 120 controlling hardware in the electronic device 101 or hardware outside the electronic device 101 to perform the particular operation. Further, "electronic device 101 performs a particular operation" may be appreciated as the memory 130 storing instructions enabling at least one of the processor 120 or hardware to perform the particular operation.

According to an embodiment, the electronic device 101 (e.g., the processor 120) may perform discovery by exchanging messages (e.g., a probe request and a probe response) defined in the standard, which is described below in greater detail with reference to FIGS. 3A and 3B. According to an embodiment, the electronic device 101 may perform discovery using Wi-Fi direct. Alternatively, the electronic device 101 may perform discovery in a different communication scheme (e.g., BT low energy (BLE), near-field communication (NFC), or BT and may later switch to a Wi-Fi direct connection procedure. According to an embodiment, the electronic device 101 is not limited as using Wi-Fi direct communication, and the electronic device 101 may use any other types of communication that may set a role as a group owner or group client. According to an embodiment, the electronic device 101 may perform low-power discovery based on neighbor awareness networking (or Wi-Fi aware) technology of the Wi-Fi alliance. NAN, Wi-Fi-based low-power discovery technology, may allow terminals to synchronize with a network called a NAN cluster. In this case, the terminals may transmit or receive beacons or service discovery frames within a synced discovery window (DW). Within the DW, the terminals may synchronize based on at least of time or frequency. Out of the DW, the terminals may maintain their sleep mode, always remaining in the discovery state at low power. The terminals may designate an active time within the DW and perform additional service discovery during the active time. The terminals may designate an operation for, e.g., Wi-Fi direct, mesh, independent basic service set (IBSS), or wireless local area network (WLAN) connection within the DW, performing operations for discovery and connection to legacy Wi-Fi. Besides, various applications capable of exchanging services and information between neighbor devices all the time may apply herein.

In operation 203, according to an embodiment, the electronic device (e.g., the processor 120) may perform provision discovery exchange through, e.g., the communication module 190. The electronic device 101 may automatically or manually select, as a target device for connection, at least one (e.g., the external electronic device 102) among at least one external electronic device that the electronic device 101 discovers. The electronic device 101 may transmit a communication signal containing a Wi-Fi simple configuration (WSC) method to the selected external electronic device. Specifically, the WSC method may be a push button configuration (PBC) method or a personal identification number (PIN) method. The two electronic devices may access each other when their respective buttons are pressed within a designated time as per the PBC method and when the passwords (PIN) of their opposite devices are entered as per the PIN method. For example, the electronic device 101 may discovery its password while receiving the password of the external electronic device. The user of the external electronic device may identify the password of the electronic device 101 and enter the password to the external electronic device. The selected external electronic device may display, e.g., in a pop-up, at least part of the received communication signal. The pop-up may include at least one of identification information (e.g., name) about the electronic device 101, which requests provision discovery, whether to accept connection, or the password (PIN) required for the WSC. Upon receipt of an accept connection command from the user of the external electronic device through the pop-up, the external electronic device may perform an accept connection control operation.

In operation 205, according to an embodiment, the electronic device 101 (or the processor 120) may perform a group owner negotiation. The group owner may play a role as an access point (AP) in the Wi-Fi direct group. The group client may serve as a station in the Wi-Fi direct group. The electronic device 101 may exchange a group owner (GO) negotiation request message, a GO negotiation response message, and a GO negotiation confirmation message with the external electronic device through, e.g., the communication module 190. The GO negotiation request may include a group owner intent which is a value for setting a GO for the electronic device 101. The GO negotiation response may include the group owner intent of the external electronic device. The electronic device 101 may compare the group owner intent of the electronic device 101 with the group owner intent of the external electronic device and may determine the role of the electronic device 101 as a group owner or group client based on at least a result of the comparison. The electronic device 101 may transmit a GO negotiation confirmation message containing confirmation information about the determined role. The electronic device 101 may also determine a P2P group attribute after connection, an operation channel, and a listening timing during the group owner negotiation process. During the group owner negotiation process, the electronic device 101 may determine whether to use the forming Wi-Fi direct group as a persistent group or a temporary group. Upon determining to use the forming Wi-Fi direct group as a persistent group, the electronic device 101 may store a credential (e.g., authentication type, encryption type, network key, or service set identifier (SSID) of the external electronic device targeted for connection and the role (e.g., at least one of group owner and group client). For example, the P2P capability may contain P2P group capability information. The electronic device 101 may set the persistent P2P group bit in the P2P group capability information to 1.

In operation 207, according to an embodiment, the electronic device 101 (e.g., the processor 120) may perform provisioning through, e.g., the communication module 190. For example, where the electronic device 101 is a group owner, the electronic device 101 may operate as a WSC registrar, and the external electronic device that is a group client may operate as a WSC enrollee. The electronic device 101 and the external electronic device 101 may perform provisioning for exchanging their credentials. When the operation ends, the two electronic devices may complete the group formation operation for forming a P2P group. When the group formation operation is complete, the electronic device 101, the group owner, may initiate a role as the group owner through an operation channel and may send out beacons as does an AP. The external electronic device 102, the group client, may access the group owner based on at least the credential identified through provisioning and perform a 4-way handshake process. When the 4-way handshake process ends, a connection may be established between the two electronic devices.

Meanwhile, provision discovery may be used as trigger-messaging to reconnect to the persistent group. Upon reconnecting the electronic devices which used to be in connection, the electronic device 101 triggering connection may transmit provision discovery requests containing the group identifier of the persistent group. The group identifier may be a combination of the SSID that the group owner of the prior connected persistent group produces and the device address of the group owner.

Figure 3A:
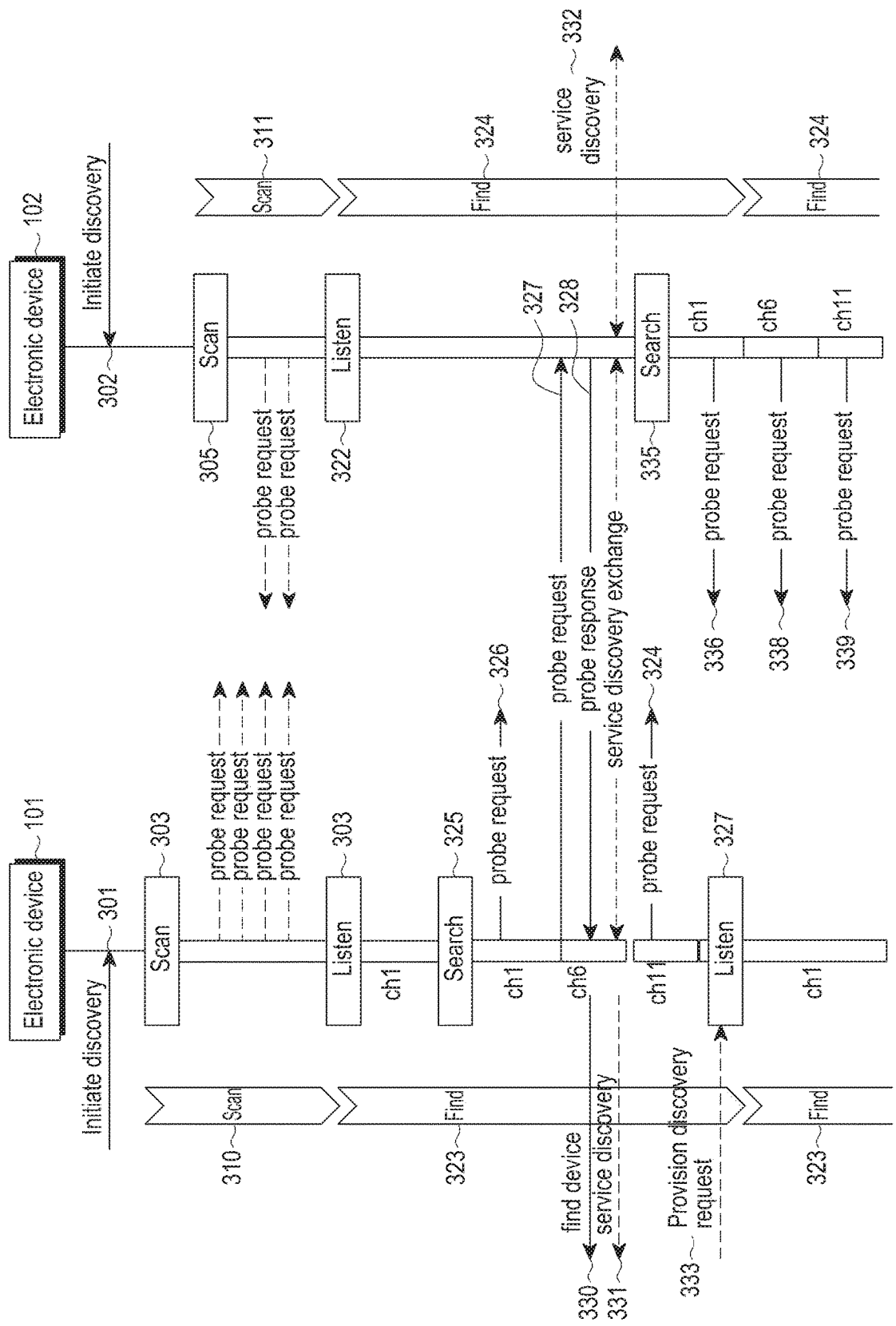
FIGS. 3A and 3B are views illustrating message transmission and reception in Wi-Fi direct communication according to various embodiments of the disclosure.
Figure 3B:
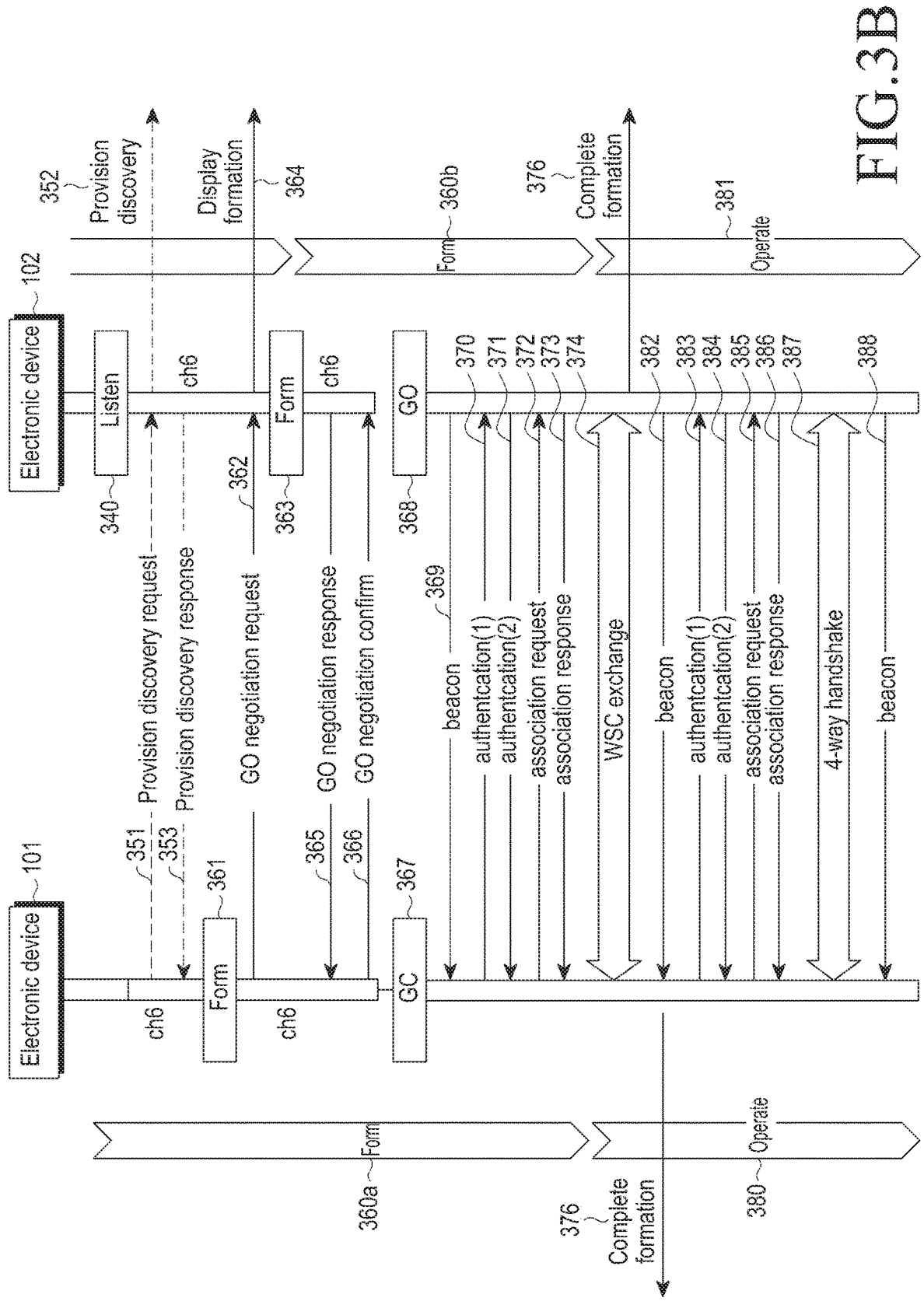

FIGS. 3A and 3B are views illustrating message transmission and reception in Wi-Fi direct communication according to various embodiments of the disclosure. FIG. 3B illustrates, e.g., a procedure performed after the procedure of FIG. 3A.

Referring to FIGS. 3A and 3B, the electronic device 101 (or the processor 120) may initiate discovery in operation 301. An external electronic device (e.g., the external electronic device 102) may initiate discovery in operation 302. After initiating discovery, the electronic device 101 may enter a scan mode 310, starting to scan 303. The electronic device 101 may transmit a probe request 304. After initiating discovery, the external electronic device 102 may enter a scan mode 311, starting to scan 305. The electronic device 101 may transmit a probe request 306. The electronic device may initiate listening (321) on a first channel ch1, and the external electronic device 102 may initiate listening 322 on a sixth channel ch6. The electronic device 101 may initiate listening 321 and enter a find mode 323, and the external electronic device 102 may initiate listening 322 and enter a find mode 324. The electronic device 101 may initiate a search 325. The electronic device 101 may transmit a probe request 326 on the first channel ch1. The electronic device 101 may transmit a probe request 327 on the sixth channel ch6. The external electronic device 102 may performing listening on the sixth channel ch6 and receive the probe request 327, and corresponding thereto, may transmit a probe response 328. The electronic device 101 and the external electronic device 102 may optionally perform a service discovery exchange 329. Meanwhile, the electronic device 101 may determine to find a device in operation 330, and the electronic device 101 may perform service discovery in operation 331. The external electronic device 102 may perform service discovery in operation 332. Through the service discovery, the electronic device 101 and the external electronic device 101 may discover various services, e.g., an opposite device transmission service, a playback service, a printing service, a displaying service, a wireless docking service, and a Wi-Fi serial bus (WSB) service. The electronic device 101 may transmit a probe request 334 on an eleventh channel ch11. The external electronic device 102 may initiate a search 335. The electronic device 101 may perform a provision discovery request 333. The electronic device 101 may perform listening 337 on the first channel ch1. The external electronic device 102 may transmit a probe request 336 on the first channel ch1, transmit a probe request 338 on the sixth channel ch6, and transmit a probe request 339 on the eleventh channel ch11. The external electronic device 102 may initiate listening 340. The electronic device 101 may transmit a provision discovery request 351 on the sixth channel ch6, and the external electronic device 102 may receive the provision discovery request 351 on the sixth channel ch6. The external electronic device 102 may perform provision discovery in operation 352. Corresponding to the provision discovery request 351, the external electronic device 102 may transmit a provision discovery response 353 on the sixth channel ch6. After receiving the provision discovery response 353, the electronic device 101 may initiate formation 361 and enter into a formation mode 360a. The electronic device 101 may transmit a group owner negotiation request 362 to the external electronic device 102 on the sixth channel ch6. The group owner negotiation request 362 may include the group owner intent (e.g., 3) of the electronic device 101. The group owner negotiation request 362 may further include at least one of P2P capability, device information, configuration timeout, listen channel, extended listen timing, intended P2P interface address, channel list, operating channel attributes, or device password identifier attribute. The external electronic device 102 may perform formation 363 and indicate the formation being initiated in operation 364. The external electronic device 102 may enter into the formation mode 360*b*. The external electronic device 102 may transmit a group owner negotiation response 365. The group owner negotiation response 365 may include the group owner intent (e.g., 10) of the external electronic device 102. The group owner negotiation response 365 may further include at least one of P2P capability, device information, configuration timeout, intended P2P interface address, channel list, operating channel attributes, or device password identifier attribute. The electronic device 101 may transmit a group owner negotiation confirmation message 366. The group owner negotiation confirmation message 366 may include at least one of P2P capability, state, channel list, or operating channel attribute.

According to an embodiment, the electronic device 101 (or the processor 120) may compare the group owner intents and determine the device with the higher group owner intent as the group owner. For example, the external electronic device 102 may be set as the group owner 368, and the electronic device 101 may be set as the group client 367. The external electronic device 102, as the group owner, may transmit a beacon 369. Corresponding to the transmission of the beacon, the electronic device 101 may transmit a first authentication 370. Corresponding to the transmission of the first authentication, the external electronic device 102 may transmit a second authentication 371. The electronic device 101 may transmit an association request 372, and the external electronic device 102 may transmit an association response 373. The electronic device 101 and the external electronic device 102 may perform a WSC exchange 374. The electronic device 101 may determine formation completion 375, and the external electronic device 102 may determine formation completion 376. The electronic device 101 may enter into an operation mode 380, and the external electronic device 102 may enter into an operation mode 381. The external electronic device 102, as the group owner, may transmit a beacon 382. Corresponding to the transmission of the beacon, the electronic device 101 may transmit a first authentication 383. Corresponding to the transmission of the first authentication, the external electronic device 102 may transmit a second authentication 384. The electronic device 101 may transmit an association request 385, and the external electronic device 102 may transmit an association response 386. The electronic device 101 and the external electronic device 102 may perform a 4-way handshake 387. Thereafter, the external electronic device 102 may transmit a beacon 388.

Figure 4:
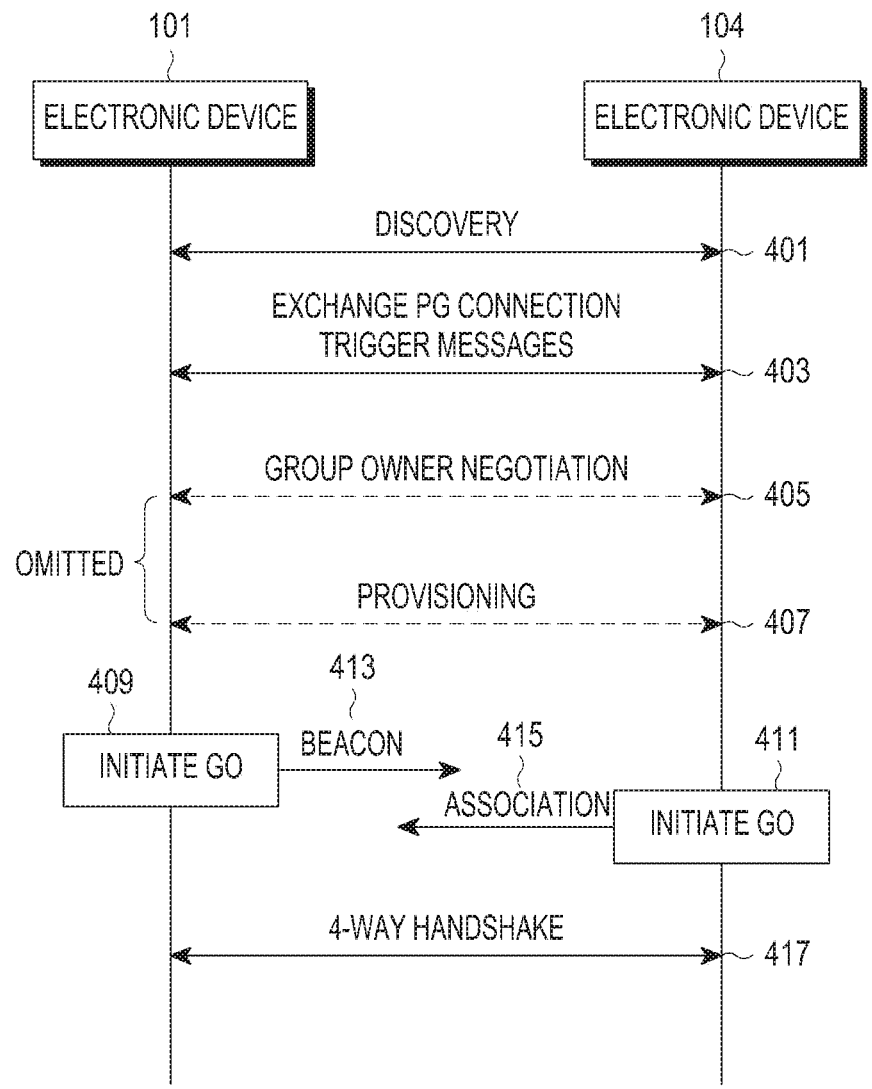
FIG. 4 is a flowchart illustrating a method for operating an electronic device upon persistent group reconnection as per a current Wi-Fi direct standard according to an embodiment of the disclosure.

FIG. 4 is a flowchart illustrating a method for operating an electronic device upon continuous group reconnection as per a current Wi-Fi direct standard according to an embodiment of the disclosure.

Referring to FIG. 4, in operation 401, the electronic device 101 (or the processor 120) following the current Wi-Fi direct standard may perform a discovery procedure with the external electronic device 102 through, e.g., the communication module 190. The electronic device 101 may receive a request for connection to the external electronic device (e.g., the external electronic device 102) among at least one electronic device discovered, from, e.g., the user.

In operation 403, the electronic device 101 may exchange a persistent group (PG) connection trigger message with the external electronic device 102. The electronic device 101 may transmit, e.g., a provision discovery request message or an invitation request message, as the persistent group connection trigger message, to the external electronic device 102. The provision discovery request message or the invitation request message may contain persistent group information and may additionally a channel list to be used for connection. The external electronic device 102 may determine whether the external electronic device 102 stores matching information through the persistent group information (e.g., group identifier, SSID, o group owner device address information) contained in the communication signal. When there is no matching information, the external electronic device 102 may transmit a provision discovery response message or invitation response message to the electronic device 101. The provision discovery response message or invitation response message may contain success information. Where there is no matching information or group connection is impossible, the external electronic device 102 may transmit a provision discovery response message or invitation response message containing a status code corresponding to 'fail.'

Upon identifying connection using the persistent group, the electronic device 101 and the external electronic device 102 following the current Wi-Fi direct standard may omit group owner negotiation 405 and provisioning 407. The electronic device 101 may complete the group formation operation using information (e.g., credential information) about the external electronic device 102 that the electronic device 101 stores. For example, the electronic device 101 might have been the group owner in the persistent group, and the external electronic device 102 might have been the group client in the persistent group. The electronic device 101 following the current standard may start to play a role as the group owner through the operating channel based on its prior role (e.g., group owner) in operation 409. For example, the electronic device 101, as the group owner, may transmit a beacon 413 in operation 413. The external electronic device 102 may initiate its role as the group client based on its prior role in operation 411. For example, the external electronic device 102 may transmit an association message 415. The external electronic device 102, the group client, may access the group owner based on at least the stored credential, and the external electronic device 102 may perform a 4-way handshake process in operation 417. By omitting the group owner negotiation 405 and provisioning 407, the electronic device 101 following the current standard may quickly perform reconnection. However, the current standard requires that the electronic device 101 play its prior role in the persistent group, thus unable to reset the role of the electronic device 101 and the external electronic device 102 corresponding to changes in environment.

Figure 5A:
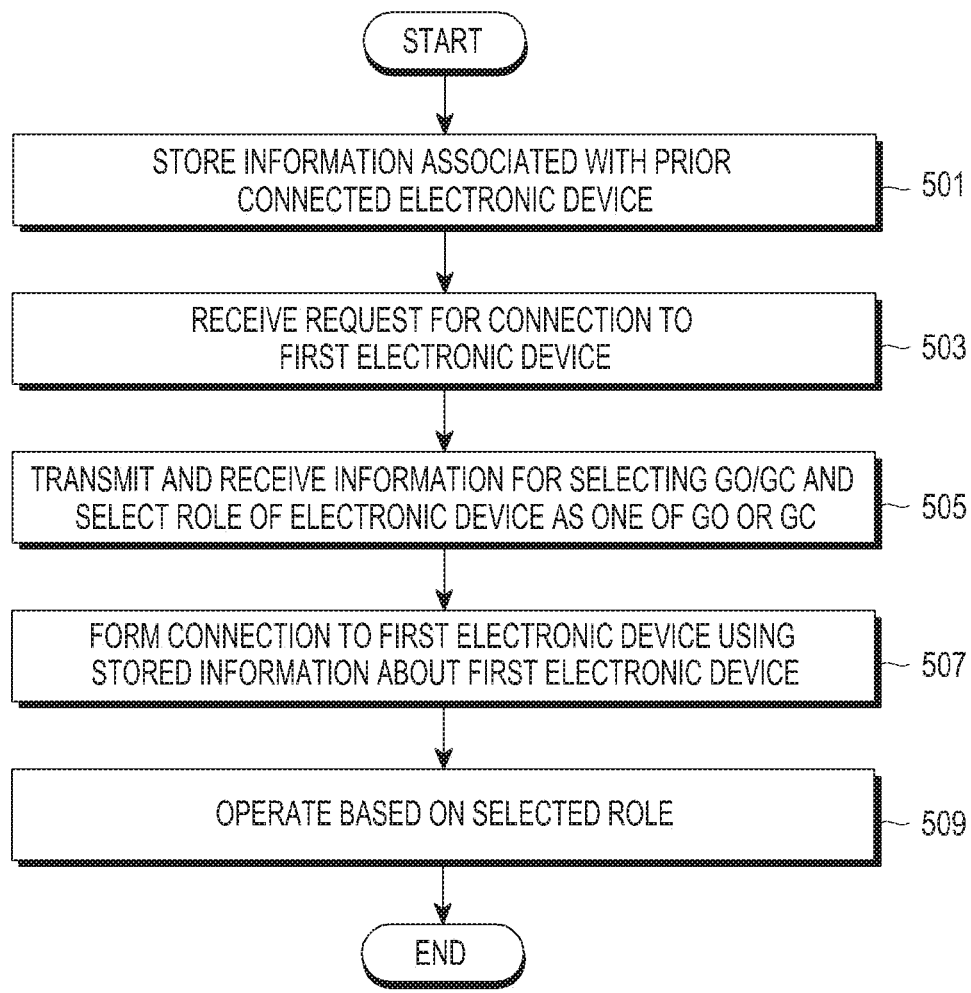
FIGS. 5A and 5B are flowcharts illustrating a method for operating an electronic device according to various embodiments of the disclosure.

FIG. 5A is a flowchart illustrating a method for operating an electronic device according to an embodiment of the disclosure.

Referring to FIG. 5A, in operation 501, the electronic device 101 (or the processor 120) may store information associated with a prior external electronic device connected. Upon determining to manage the communication group where the electronic device 101 and the external electronic device connected in the prior connection process belong as the persistent group, the electronic device 101 may store information (e.g., credential information) about the electronic devices included in the persistent group, with the information associated with the group identifier.

In operation 503, according to an embodiment, the electronic device 101 (or the processor 120) may receive a request for connection to a first electronic device (e.g., the external electronic device 102) among at least one external electronic device discovered. The electronic device 101 may discovery at least one electronic device discovered and receive a selection of the first electronic device from the user. Alternatively, the electronic device 101 may select the first electronic device from among at least one electronic device discovered according to a predesignated condition without the user's selection. Meanwhile, as set forth above, according to an embodiment, the electronic device 101 may perform 1:N connection (where N is a positive integer not less than 2) as well as 1:1 connection. The electronic device 101 may determine whether it stores information about the selected first electronic device. The electronic device 101 may determine whether at least one of pieces of information stored in the persistent group includes information about the first electronic device identified during the discovery. Upon determining that at least one of pieces of information stored in the persistent group includes information about the first electronic device identified during the discovery, the electronic device 101 may determine to perform reconnection to the first electronic device.

When at least one of pieces of information stored in the persistent group is determined to include information about the first electronic device identified during the discovery, the electronic device 101 (or the processor 120) may transmit/receive information for selecting a role, as a group owner or group client, in the group in operation 505, according to an embodiment. For example, the electronic device 101 may transmit a communication signal containing the group intent of the electronic device 101 to the first electronic device and may receive a communication signal containing the group intent of the first electronic device from the first electronic device. The electronic device 101 may determine the role of the electronic device 101 as at least one of the group owner and group client based on at least exchanged information (e.g., group intent) for determining role.

In operation 507, according to an embodiment, the electronic device 101 (or the processor 120) may form a connection with the first electronic device using the stored information (e.g., credential) about the first electronic device. In this case, the electronic device 101 may form a connection based on the newly determined role. In other words, the electronic device 101 may form a connection using the prior stored information about the first electronic device and the newly determined role.

In operation 509, the electronic device 101 may operate based on the selected role. Thus, the electronic device 101 may not only form a connection based on the newly determined role but also quickly perform reconnection using the prior stored credential of the first electronic device.

Figure 5B:
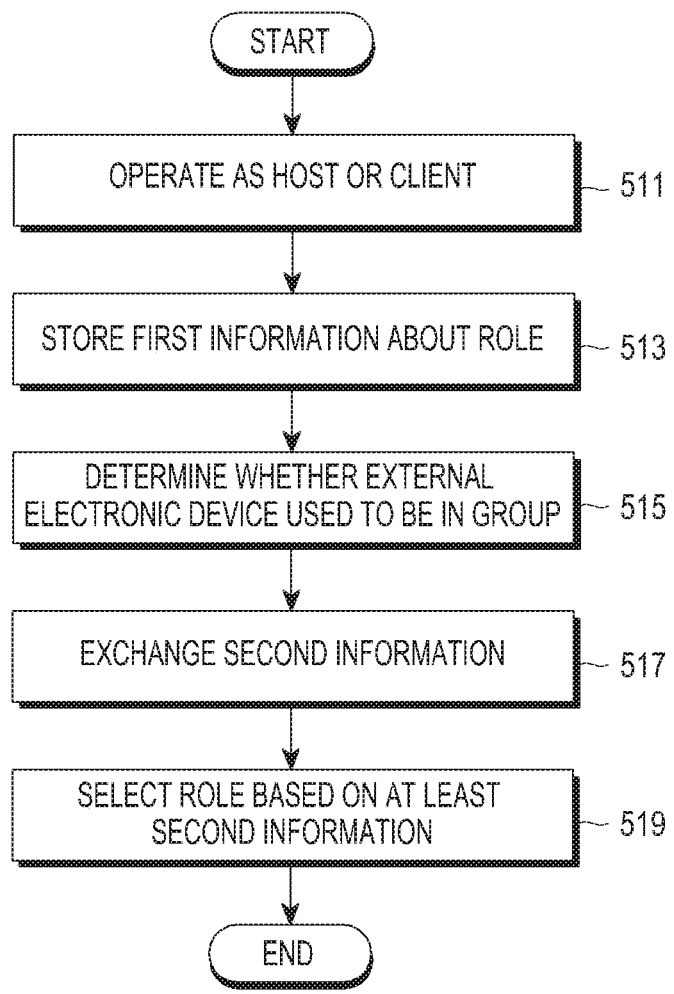

FIG. 5B is a flowchart illustrating a method for operating an electronic device according to an embodiment of the disclosure.

Referring to FIG. 5B, in operation 511, the electronic device 101 (or the processor 120) may form a group with an external electronic device (e.g., the external electronic device 102) through first communication. In the first communication, the electronic device 101 may operate as at least one of a host and client. The communication module 190 (e.g., a wireless communication circuit) of the electronic device 101 may provide wireless communication based on an infrastructure and peer-to-peer (P2P) communication protocol. The infrastructure communication protocol may include a Wi-Fi protocol or an institute of electrical and electronics engineers (IEEE) 802.11, and the P2P communication protocol may include a Wi-Fi direct protocol. The group may be a persistent group defined in the Wi-Fi direct protocol. The electronic device 101 may omit at least one of group owner negotiation or provisioning defined in the Wi-Fi direct protocol. The host may be a group owner as defined in the Wi-Fi direct protocol, and the client may be a group client as defined in the Wi-Fi direct protocol.

In operation 513, the electronic device 101 may store, in, e.g., the memory 130, first information about the role of the electronic device as at least one of the host and client.

In second communication with the external electronic device 102, after the first communication, the electronic device 101 may determine whether the external electronic device 102 used to be in the group in operation 515.

In operation 517, the electronic device 101 may exchange second information with the external electronic device 102 based on at least part of the status of at least one of the electronic device 101 and/or the external electronic device 102.

In operation 519, the electronic device 101 may select its role as the host or client based on at least part of the second information. The electronic device 101 may transmit a message to the external electronic device 102. The message may include a vendor specific information element (VSIE) containing the group identifier. The VSIE may further include a number indicating the intent of becoming the group owner, e.g., group owner intent. The VSIE may further include a tie breaker bit. The VSIE is described below in greater detail. Here, the at least one status may include the status of connection between the electronic device and an external access point. The at least one status may include the status of the electronic device 101 regarding the execution of at least one application program.

Figure 6:
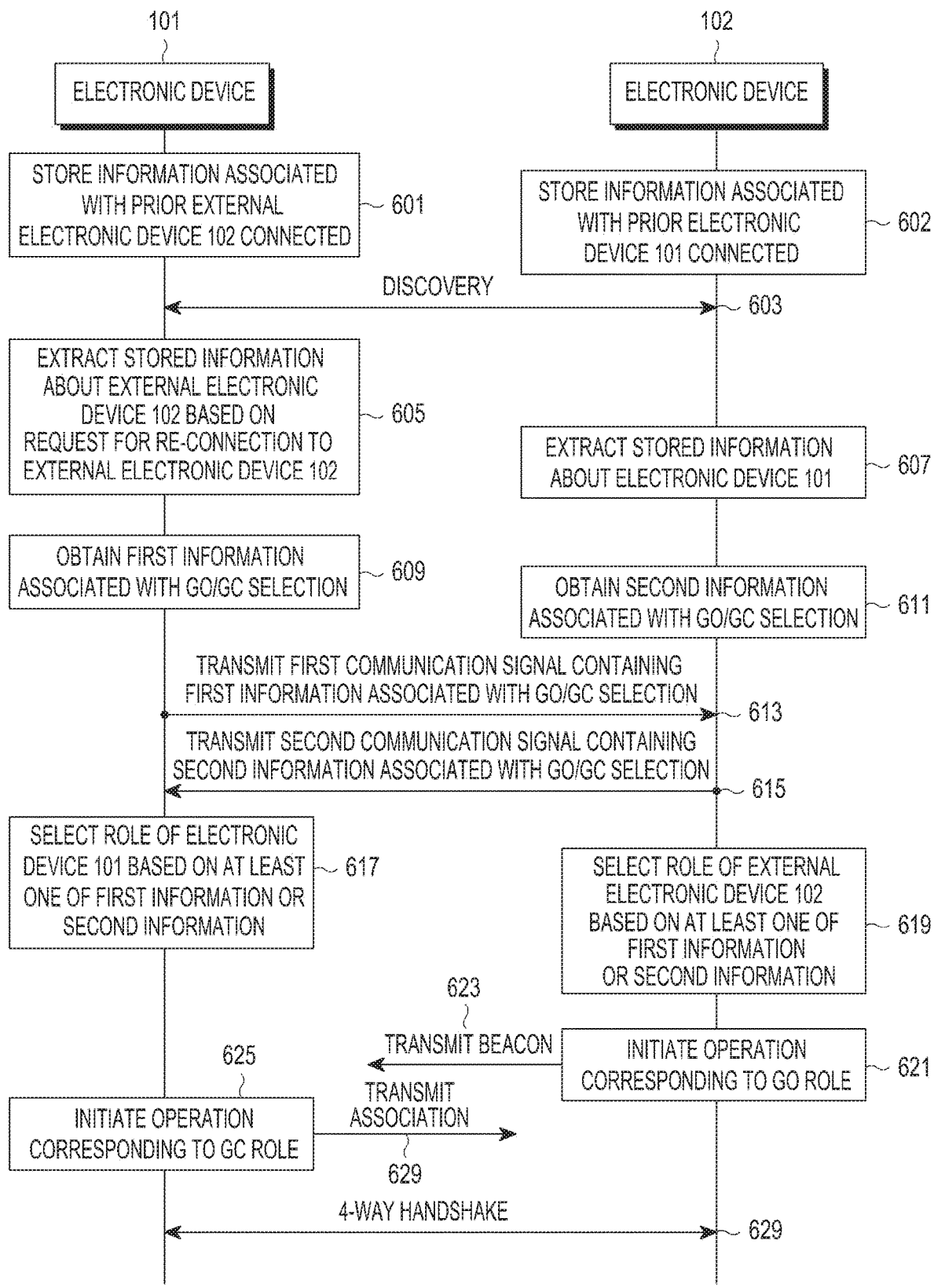
FIG. 6 is a flowchart illustrating operations of electronic devices according to an embodiment of the disclosure.

FIG. 6 is a flowchart illustrating operations of electronic devices according to an embodiment of the disclosure.

Referring to FIG. 6, in operation 601, the electronic device 101 may store information associated with a prior external electronic device 102 connected. For example, the electronic device 101 may form a Wi-Fi direct group with the prior external electronic device 102 and may determine to manage the group as a persistent group. The electronic device 101 may store the group identifier and information about the external electronic device 102 (e.g., the credential of the external electronic device 102).

In operation 602, the external electronic device 102 may store information associated with the prior electronic device 101 connected. For example, the external electronic device 102 may also manage the Wi-Fi direct group as a persistent group and may store the group identifier and information associated with the electronic device 101 included in the persistent group (e.g., the credential of the electronic device 101). Thereafter, the connection between the electronic device 101 and the external electronic device 102 may be released. As set forth above, during the group owner negotiation process, the electronic device 101 may determine whether to use the forming Wi-Fi direct group as a persistent group or a temporary group. For example, the electronic device 101 or the external electronic device 102 may declare the corresponding group as a persistent group during the Wi-Fi direct connection process. The electronic device 101 or the external electronic device 102 may perform such persistent group declaration using the flag in the P2P capability attribute. The P2P capability attribute may be included in the beacon frame, probe response, or GO negotiation frames. Upon determining to use the Wi-Fi direct group as persistent group, the electronic device 101 or the external electronic device 102 may store the credential of the target for connection.

After the connection between the electronic device 101 and the external electronic device 102 is released, the electronic device 101 may perform discovery with the external electronic device 102 in operation 603. For example, the electronic device 101 may perform discovery by exchanging messages (e.g., probe request or probe response) defined in the standard with the external electronic device 102.

In operation 605, the electronic device 101 may receive a request for reconnection to the external electronic device 102. For example, the electronic device 101 may display a user interface for selecting at least one from among at least one discovered electronic device including the external electronic device 102. The electronic device 101 may receive a selection of the external electronic device 102 through the user interface. Although an example in which the electronic device 101 connects to one external electronic device (e.g., the external electronic device 102) has been described above, the electronic device 101 may perform 1:N connection (where N is a positive integer not less than 2) as well as 1:1 connection according to an embodiment. Here, N may be determined depending on the capability of the group owner. The electronic device 101 may extract information about the external electronic device 102 from pieces of information stored in connection with the persistent group. For example, the electronic device 101 may determine whether the device address information contained in the probe response received from the external electronic device 102 is included in the information associated with the persistent group. Where the information associated with the persistent group includes the device address information contained in the probe response, the electronic device 101 may determine that the external electronic device 102 used to be in the persistent group. The electronic device 101 may extract the credential of the external electronic device 102 and the group identifier.

In operation 607, the external electronic device 102 may extract the stored information about the electronic device 101. The external electronic device 102 may also extract the information about the electronic device 101 which used to be in the persistent group.

In operation 609, the electronic device 101 may obtain first information associated with selection of a role (GO or GC) in the group. The first information may include, e.g., a GO intent. The first information may also include a preferred mode. The preferred mode may contain information directly indicating group owner or group client. The electronic device 101 may obtain the first information based on at least part of the current status of the electronic device 101. For example, the electronic device 101 may obtain the first information based on at least part of whether the electronic device 101 connects to an AP. For example, the electronic device 101 may obtain the first information based on at least part of whether the electronic device 101 operates as a Wi-Fi serial bus (WSB) host. It will be appreciated by one of ordinary skill in the art that the electronic device 101 may obtain the first information based on at least information that may affect the GO intent. According to an embodiment, the GO intent of the electronic device 101 may differ between when forming connection with the external electronic device 102 in the persistent group and when performing reconnection, and thus, role resetting may be done dynamically.

In operation 611, the external electronic device 102 may obtain second information associated with selection of a role (GO or GC) in the group. The external electronic device 102 may obtain the second information based on at least various pieces of information (e.g., whether an AP connects or whether it is a WSB host) at the time of reconnection. The second information may include the GO intent or preferred mode of the external electronic device 102.

In operation 613, according to an embodiment, the electronic device 101 (or the processor 120) may transmit a first communication signal containing the first information to the external electronic device 102 upon performing reconnection to the persistent group. According to an embodiment, the electronic device 101 may transmit a provision discovery request message or invitation request message containing the first information. For example, the first information, e.g., GO intent or preferred mode, may be contained in a field reserved for future use among the fields of the provision discovery request message.

According to an embodiment, an element may be defined as set forth in Table 1. The element defined in Table 1 may be denoted a vendor specific information element (VSIE).

TABLE 1

| Field | Length (byte) | Value |
|---|---|---|
| Element ID | 1 | 0xDD: IEEE802.11 vendor specific usage |
| Length | 1 | Variable |
| OUI(organizationally unique identifier) | 3 | 0x0000f0: Samsung Electronics |
| OUI type | 1 | 0x0A: VENDOR_P2P_SKIP_DHCP_OUI_TYPE<br>0x0B: VENDOR_CONTACT_INFO_OUI_TYPE<br>0x0C: VENDOR_SCREEN_SHARING_OUI_TYPE<br>0x0F: VENDOR_SAMSUNG_DISCOVERY_OUI_TYPE<br>0x11: VENDOR_P2P_PRE_KEY_OUI_TYPE<br>0x77: VENDOR_SCONNECT_OUI_TYPE<br>Newly designated: VENDOR_P2P_PERSISTENT_OUI_TYPE |
| Attribute ID | 1 | 0x00: group owner intent and tie breaker bit |
| Length | 2 | 1 |
| Group owner intent information | | bit 0: tie breaker (0 or 1)<br>bit 1 to bit 7: group owner intent (0 to 15) |
| Attribute ID | 1 | 0x01: new group ID information |
| Length | 2 | 6 through 38 |
| P2P device address | 6 | P2P device address of group owner |
| SSID | 0 through 32 | SSID of group owner |

According to an embodiment, the electronic device 101 or the external electronic device 102 may include the elements defined in Table 1 in various messages, such as a provision discovery request, a provision discovery response, an invitation request, an invitation response, a probe request, or a probe response. In Table 1 above, the element ID field may denote a P2P information element (IE), and the "0xDD" value may be assigned for vendor specific usage and may be, e.g., one-byte long. The length field which is one-byte long may denote the length of the next field of the IE in the octet, and its length may be varied and may be set to be longer by 4 than the overall length of the P2P attribute. The OUI field which is 3-byte long may denote the entity defining the element. For example, the OUI field being 50 6F 9A may indicate that the defining entity is Wi-Fi alliance (WFA). In Table 1, the OUI field value may be 0x0000f0 which denotes that the defining entity is a particular vendor (e.g., Samsung electronics). The one-byte OUI type field may denote various types defined by a particular vendor. For example, the OUI type field being 0x0C may indicate that the element is intended for screen sharing defined by a particular vendor (VENDOR_SCREEN_SHARING_OUI_TYPE). According to an embodiment, a new OUI type value may be designated for an element aiming at resetting the role during the reconnection process for the persistent group. The reset value is not limited to a particular one. For example, where the OUT type value in the element is a newly designated one, the opposite device (e.g., the external electronic device 102) receiving a message containing the element may reset the role during the persistent group reconnection. The first attribute ID field which is one-byte long may represent at least one of the GO intent or the tie breaker. For example, where 0x00 is assigned to the attribute ID field, the opposite electronic device (e.g., the external electronic device 102) receiving a message containing the element may determine that the corresponding field (e.g., group owner intent information) value is the tie breaker and GO intent of the device transmitting the message. The length field which is two-byte long may be 1, denoting that the next field (e.g., group owner intent information) is one-byte long. The group owner intent information field may be constituted of, e.g., 0 to 7 octet bits. The tie breaker value (e.g., 0 or 1) may be reflected in the 0th bit, and the GO intent values (e.g., 0 to 15) may be reflected in the first bit through the seventh bit. For example, 0x01 may be reflected in the second attribute ID field which is one-byte long, denoting that it is new group ID information. According to an embodiment, the new group ID may be defined by the device information of the group owner and the SSID of the group owner device. The length field which is two-byte long may have a value among 6 to 38. The P2P device address may be reflected in the P2P device address field which is six-byte long. The SSID of the group owner may be reflected in the SSID field which is 0- to 32-byte long. A VSIE including the GO intent, tie breaker, and new group ID may be defined as above. According to an embodiment, the electronic device 101 or the external electronic device 102 may include the VSIE in various messages transmitted or received during the persistent group reconnection process. Thus, the electronic device 101 may exchange the GO intent and tie breaker with the opposite device, enabling resetting the role even during persistent group reconnection.

In operation 615, the external electronic device 102 may transmit a second communication signal containing second information to the electronic device 101. According to an embodiment, the external electronic device 102 may transmit, to the electronic device 101, e.g., a provision discovery response message or invitation response message containing the second information, e.g., the preferred mode or GO intent of the external electronic device 102. For example, the second information, e.g., GO intent or preferred mode, may be contained in a field reserved for future use among the fields of the provision discovery response message. For example, upon identifying that the provision discovery request contains the GO intent of the electronic device 101, the external electronic device 102 may transmit a provision discovery response containing the GO intent of the external electronic device 102 to the electronic device 101. According to an embodiment, the electronic device 101 may include an indicator for GO re-negotiation in the provision discovery request. Upon identifying the indicator for GO re-negotiation in the provision discovery request, the external electronic device 102 may transmit a provision discovery response containing the GO intent of the external electronic device 102 to the electronic device 101.

In operation 617, according to an embodiment, the electronic device 101 may select the role in group of the electronic device 101 based on at least one of the first information or the second information. For example, where the GO intent of the electronic device 101 contained in the first information is higher than the GO intent of the external electronic device contained in the second information, the electronic device 101 may set the electronic device 101 to the group owner and the external electronic device 102 to the group client. In this case, the external electronic device 102 may make the same determination. Thus, no group owner confirmation message may be transmitted or received. In preparation for the case where the GO intents of the two electronic devices are the same, the first communication signal and the second communication signal may contain a tie breaker value, which is described below in greater detail. Where at least one of the first information and the second information contains the preferred mode indicating the GO mode, the electronic device 101 may set the electronic device to the group owner.

In operation 619, the electronic device 102 may select the role of the external electronic device 102 based on at least one of the first information or the second information. According to an embodiment, it is assumed that the external electronic device 102 is reset to the group owner. In other words, the external electronic device 101 may be reset from the group owner which it used to play a role as in the persistent group to its new role as group owner.

In operation 621, the external electronic device 102 may initiate an operation corresponding to the role as the group owner. Since the group owner may operate like an AP of Wi-Fi communication, the external electronic device 102 may transmit a beacon in operation 623.

In operation 625, the electronic device 101 may initiate an operation corresponding to the role as group client. For example, corresponding to the receipt of the beacon from the group owner, external electronic device 102, the electronic device 101 may transmit an association in operation 627. Or, corresponding to the receipt of the beacon, the electronic device 101 may transmit a first authentication. The external electronic device 102 may transmit a second authentication corresponding to the first authentication, and the electronic device 101 may transmit an association request corresponding to the second authentication. In operation 629, the electronic device 101 and the external electronic device 102 may form communication connection after performing a 4-way handshake. Alternatively, corresponding to the receipt of the association request, the external electronic device 102 may transmit an association response and then perform a 4-way handshake. The electronic device 101 and the external electronic device 102 may communicate various types of data through the formed communication connection.

According to an embodiment, the electronic device 101 may manage the Wi-Fi direct group of the electronic device 101 and the external electronic device 102 as a new persistent group and store corresponding information together with or separately from the prior persistent group information.

Figure 7:
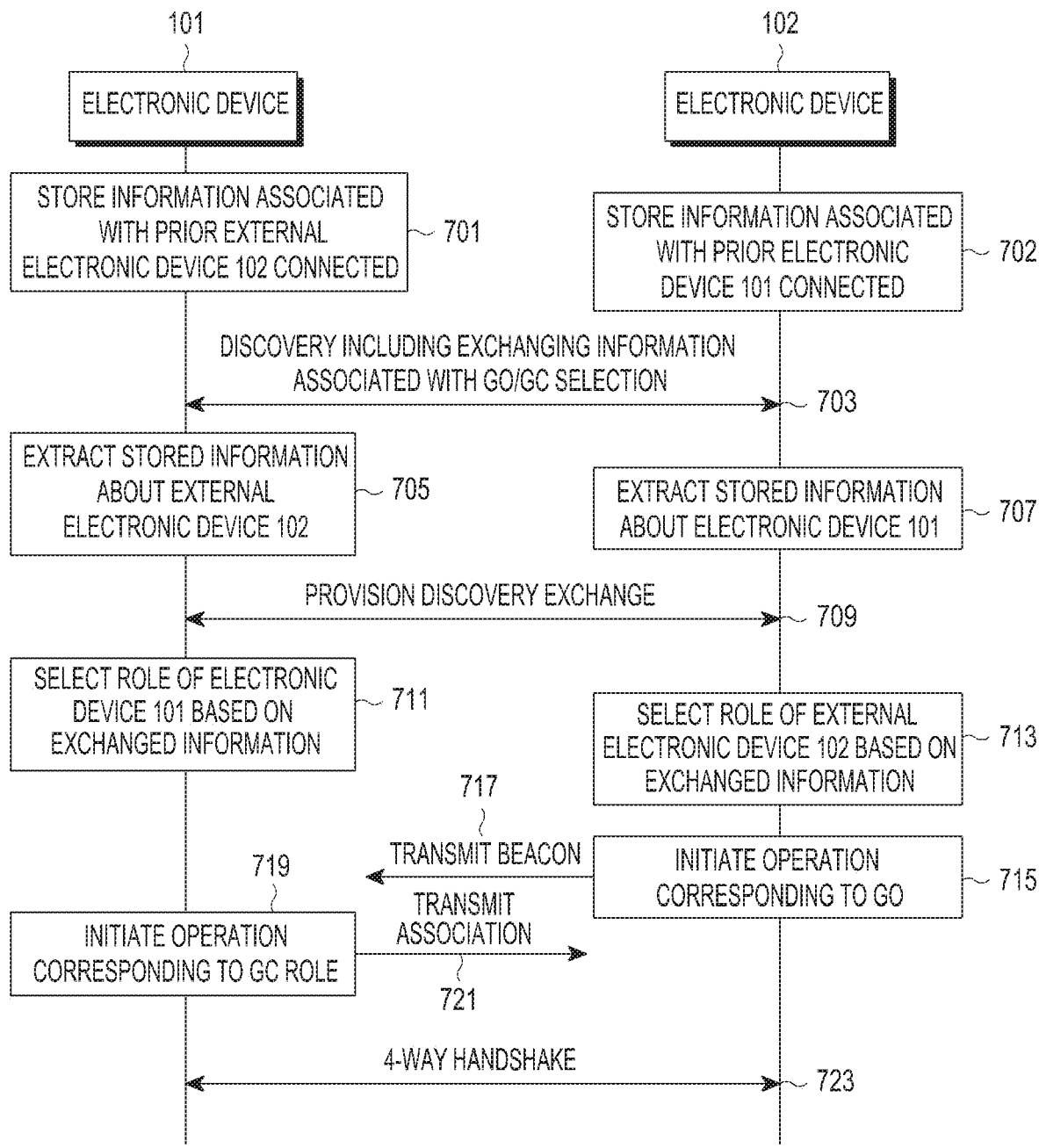
FIG. 7 is a flowchart illustrating a method for operating electronic devices according to an embodiment of the disclosure.

FIG. 7 is a flowchart illustrating a method for operating electronic devices according to an embodiment of the disclosure.

Referring to FIG. 7, in operation 701, the electronic device 101 (e.g., the processor 120) may store information associated with a prior external electronic device 102 connected. As set forth above, the electronic device 101 may form a Wi-Fi direct group with the prior external electronic device 102 and may determine to manage the group as a persistent group. The electronic device 101 may store the group identifier and information about the external electronic device 102 (e.g., the credential of the external electronic device 102).

In operation 702, the external electronic device 102 may store information associated with the prior electronic device 101 connected.

In operation 703, according to an embodiment, the electronic device 101 (or the processor 120) may perform discovery including exchanging information associated with the selection of the role (e.g., GO or GC) in the group. For example, upon receipt of a request for activating Wi-Fi direct, the electronic device 101 may transmit a probe request message. The electronic device 101 may transmit the probe request message containing information (e.g., the GO intent or preferred mode of the electronic device 101) associated with the selection of the role in the group. Such information as GO intent or preferred mode may be contained in a field reserved for future use among the fields of the probe request message. The external electronic device 102 may receive the probe request message, and corresponding thereto, transmit a probe response message. The external electronic device 102 may transmit the probe request message containing information (e.g., the GO intent or preferred mode of the external electronic device 102) associated with the selection of the role in the group. Such information as GO intent or preferred mode may be contained in a field reserved for future use among the fields of the probe response message. For example, upon identifying that the provision discovery request contains the GO intent of the electronic device 101, the external electronic device 102 may transmit a provision discovery response containing the GO intent of the external electronic device 102 to the electronic device 101. According to an embodiment, the electronic device 101 may include an indicator for GO re-negotiation in the provision discovery request. Upon identifying the indicator for GO re-negotiation in the provision discovery request, the external electronic device 102 may transmit a provision discovery response containing the GO intent of the external electronic device 102 to the electronic device 101.

In operation 705, according to an embodiment, upon determining that the external electronic device 102, which the electronic device 101 intends to connect to, used to be in the persistent group, the electronic device 101 (or the processor 120) may extract the stored information about the external electronic device 102. For example, the electronic device 101 may select at least one of external electronic devices discovered as the target electronic device for connection, based on the user's selection or automatically. The electronic device 101 may determine whether the persistent group includes information about the target electronic device for connection.

In operation 707, the external electronic device 102 may extract the stored information about the electronic device 101.

In operation 709, the electronic device 101 and the external electronic device 102 may exchange provision discovery. According to an embodiment, the electronic device 101 may transmit a provision discovery request message or invitation request message to the external electronic device 102. The external electronic device 102 may transmit a provision discovery response message or invitation response message to the electronic device 101. In this case, the provision discovery request message or provision discovery response message may not contain information for determining the role in the group, such as GO intent.

In operation 711, the electronic device 101 may select the role of the electronic device 101 based on the exchanged information. For example, the electronic device 101 may compare the GO intent of the electronic device 101 contained in the probe request message with the GO intent of the external electronic device 102 contained in the probe response message, setting the role of the electronic device 101.

In operation 713, the external electronic device 102 may select the role of the external electronic device 102 based on the exchanged information. For example, the external electronic device 102 may compare the GO intent of the electronic device 101 contained in the probe request message with the GO intent of the external electronic device 102 contained in the probe response message, setting the role of the external electronic device 102. In this case, it is assumed that the external electronic device and the electronic device 101 are set to the group owner and the group client, respectively.

In operation 715, the external electronic device 102 may initiate an operation corresponding to the role as the group owner of the external electronic device 102. The external electronic device 102 may transmit a beacon in operation 717. In operation 719, the electronic device 101 may initiate an operation corresponding to the role as the group client of the electronic device 101. The electronic device 101 may transmit an association corresponding to the beacon in operation 721. Or, corresponding to the receipt of the beacon, the electronic device 101 may transmit a first authentication. The external electronic device 102 may transmit a second authentication corresponding to the first authentication, and the electronic device 101 may transmit an association request corresponding to the second authentication.

In operation 723, the electronic device 101 and the external electronic device 102 may perform a 4-way handshake. Alternatively, corresponding to the receipt of the association request, the external electronic device 102 may transmit an association response and then perform a 4-way handshake. Accordingly, Wi-Fi direct communication may be reconnected between the electronic device 101 and the external electronic device 102. As described above in connection with FIGS. 6 and 7, the electronic device 101 and the external electronic device 102 may include information for determining the role in the group in any message.

Figure 8A:
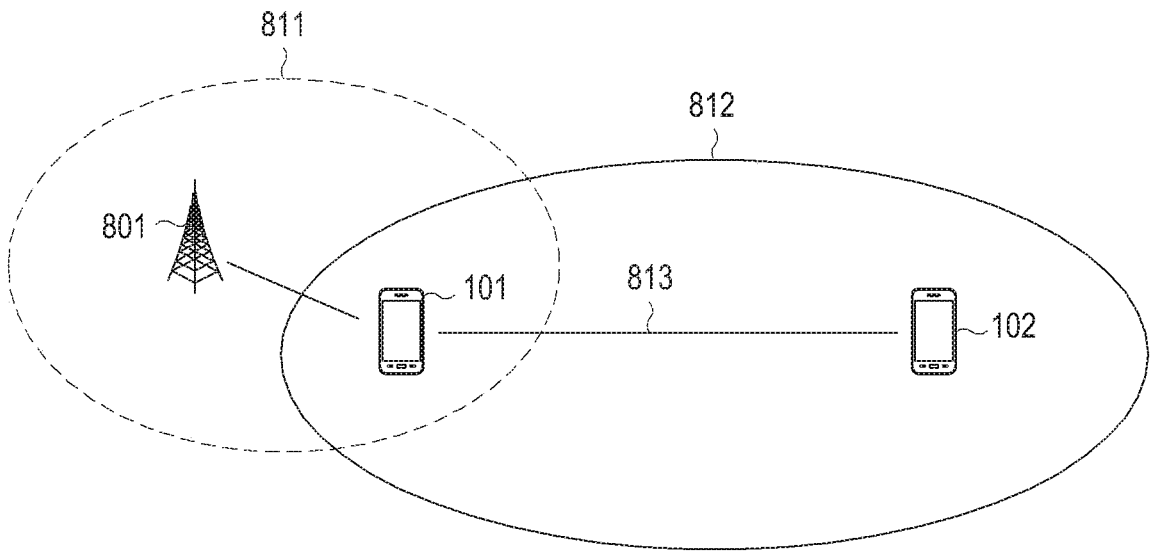
FIGS. 8A and 8B are views illustrating an example of resetting a role as per AP connection according to an embodiment of the disclosure.
Figure 8B:
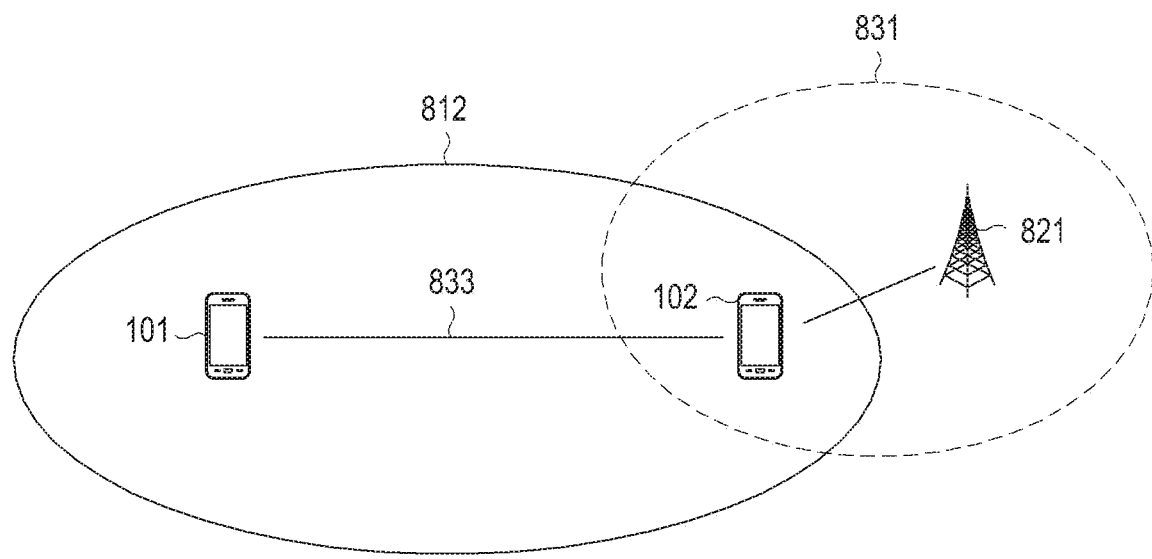

FIGS. 8A and 8B are views illustrating an example of resetting a role as per AP connection according to various embodiments of the disclosure.

Referring to FIG. 8A, an AP 801 may have communication coverage 811. The electronic device 101 in the communication coverage 811 may connect to the AP 801. Further, the electronic device 101 and the external electronic device 102 may form a Wi-Fi direct group 812 and Wi-Fi direct communication connection 813. In this case, the electronic device 101 may operate in a concurrent mode. Thus, the electronic device 101 connected to the AP 801 may advantageously operate as the group owner. This is why in the concurrent mode (e.g., Wi-Fi and Wi-Fi direct) simultaneously supporting two types of topology or Wi-Fi-based connection, better transmission efficiency and stability can be achieved when the types of connection operate on the same channel than on different channels. Where the external electronic device 102 not connected with the AP 801 operates as the group owner, the external electronic device 102 may operate on multiple channels because Wi-Fi is different in operating channel from Wi-Fi direct, and thus, transmission efficiency and stability may be degraded. Thus, since it is the group owner's role to determine the operating channel in the Wi-Fi direct group, the electronic device 101 connected to the AP 801 may be set to operate as the group owner. For example, upon detecting connection to the AP 801, the electronic device 101 may adjust the group intent to a relatively high value (e.g., 8), allowing the electronic device 101 to become the group owner in the group owner negotiation process. After becoming the group owner, the electronic device 101 may make the operating channel of Wi-Fi direct the same as the operating channel of Wi-Fi.

The Wi-Fi direct communication connection 813 between the electronic device 101 and the external electronic device 102 may be released. The electronic device 101 and the external electronic device 102 may manage the Wi-Fi direct group 812 as a persistent group and each may store the opposite device's credential, group identifier, or other information. The electronic device 101 may attempt to reconnect to the external electronic device 102.

Referring to FIG. 8B, the external electronic device 102 may be in the communication coverage 831 of an AP 821. Thus, the external electronic device 102 may connect to the AP 821 but the electronic device 101 may not. In this case, it may be advantageous that the external electronic device 102 serves as the group owner. While the external electronic device 102 and the electronic device 101 form a Wi-Fi direct group 832 and a Wi-Fi direct connection 833, role resetting may be carried out as set forth above in connection with FIGS. 5A and B, 6, or 7. Thus, the external electronic device 102 may become the group owner, which is described below in further detail with reference to FIG. 9. As described supra, the electronic device 101 with no connection with the AP 821 may be prevented from operating as the group owner, preventing a degradation in transmission efficiency and stability due to setting the Wi-Fi channel and Wi-Fi direct channel to be different.

Figure 9:
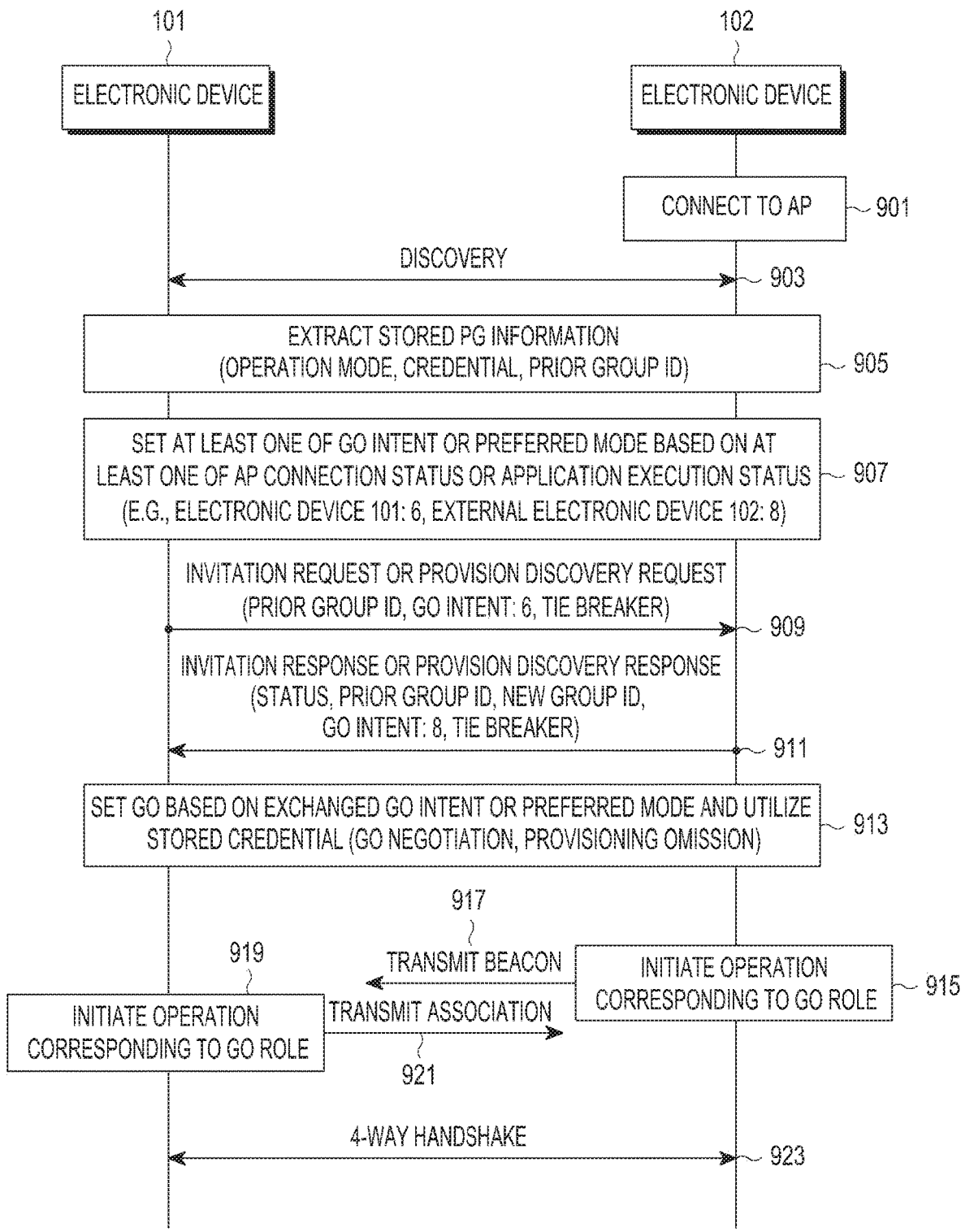
FIG. 9 is a flowchart illustrating operations of electronic devices according to an embodiment of the disclosure.

FIG. 9 is a flowchart illustrating operations of electronic devices according to an embodiment of the disclosure.

According to an embodiment, the electronic device 101 may be used to form a Wi-Fi direct group with the external electronic device 102 while the electronic device 101 and the external electronic device 102 may be used to operate as the group owner and group client, respectively, in the group. The electronic device 101 and the external electronic device 102 may store information about the persistent group. Thereafter, the connection between the electronic device 101 and the external electronic device 102 may be released. In operation 901, the external electronic device 102 may connect to an AP.

Referring to FIG. 9, in operation 903, the electronic device 101 and the external electronic device 102 may perform discovery. For example, the electronic device 101 may perform discovery by exchanging messages (e.g., probe request or probe response) defined in the standard with the external electronic device 102. The electronic device 101 may determine whether the external electronic device 102 belongs to the persistent group based on the device address information about the external electronic device 102.

Upon determining that the external electronic device 102 belongs to the persistent group, the electronic device 101 and the external electronic device 102 may extract stored persistent group information, e.g. operating mode, credential, and prior group identifier, in operation 905.

In operation 907, the electronic device 101 and the external electronic device 102 may set at least one of the GO intent or preferred mode based on at least one of the AP connection status or application execution status. For example, upon connecting to the AP, the electronic device 101 and the external electronic device 102 may previously set the GO intent to 8. The external electronic device 102 may set its GO intent to 8 according to connection to the AP. The electronic device 101 may set its GO intent to 6 based on at least part of various factors.

In operation 909, the electronic device 101 may transmit a provision discovery request or invitation request containing the prior group identifier, the GO intent (e.g., 6) of the electronic device 101, and the tie breaker value (e.g., 0) to the external electronic device 102. The electronic device 101 may, e.g., randomly, set the tie breaker value to 0 or 1. The tie breaker may be a value by which, where the two electronic devices have the same GO intent, one of the two with a particular tie breaker value (e.g., 1) becomes the group owner.

In operation 911, the external electronic device 102 may transmit an invitation response or provision discovery response containing a status (e.g., failure or success in forming a persistent group), the prior group identifier, a new group identifier, the GO intent (e.g., 8), and the tie breaker of the external electronic device 102. The new group identifier may be set based on at least identification information about the electronic device reset to the group owner. The group identifier may be a combination of the SSID and the group owner's device address. Thus, where the new group owner is the same as the group owner in the persistent group, the new group identifier may be the same as the prior group identifier. Where the new group owner is different from the group owner in the persistent group, the SSID alone in the new group identifier may be the same as the SSID in the prior group identifier. According to an embodiment, the prior group identifier may be fully different from the new group identifier. The tie breaker of the external electronic device 102 may be set to be different from the tie breaker of the electronic device 101.

In operation 913, the electronic device 101 and the external electronic device 102 may set a new group owner based on the exchanged GO intents or preferred modes and omit GO negotiation and provisioning using the stored credential. For example, the external electronic device 102 which has the higher GO intent may be set to the group owner, and the external electronic device 101 which has the lower GO intent may be set to the group client.

In operation 915, the external electronic device 102 may initiate an operation corresponding to its new role, i.e., as the group owner. For example, in operation 917, the external electronic device 102 may transmit a beacon. In operation 919, the electronic device 101 may initiate an operation corresponding to its new role, i.e., as the group client. For example, in operation 921, the electronic device 101 may transmit an association corresponding to the received beacon. Or, corresponding to the receipt of the beacon, the electronic device 101 may transmit a first authentication. The external electronic device 102 may transmit a second authentication corresponding to the first authentication, and the electronic device 101 may transmit an association request corresponding to the second authentication.

In operation 923, the electronic device 101 and the external electronic device 102 may perform a 4-way handshake, forming Wi-Fi direct connection. Alternatively, corresponding to the receipt of the association request, the external electronic device 102 may transmit an association response and then perform a 4-way handshake. The electronic device 101 and the external electronic device 102 may manage the newly formed Wi-Fi direct group as a new persistent group. The electronic device 101 and the external electronic device 102 may manage different persistent groups for the same credential and selectively use the persistent groups for later connection. Alternatively, the electronic device 101 and the external electronic device 102 may exchange GO intents using a probe request and a probe response, rather than a provision discovery request and provision discovery response, as set forth above in connection with FIG. 7. According to an embodiment, the electronic device 101 or the external electronic device 102 may store the intent about the status information in a database and use the database upon setting the intent or preferred mode based on the status information. For example, the electronic device 101 or the external electronic device 102 may store association information between various statuses and GO intents, such as association information between the status of being connected to the AP and a GO intent of 8. The electronic device 101 or the external electronic device 102 may identify the GO intent corresponding to the current status and exchange the GO intent with its opposite device.

Figure 10:
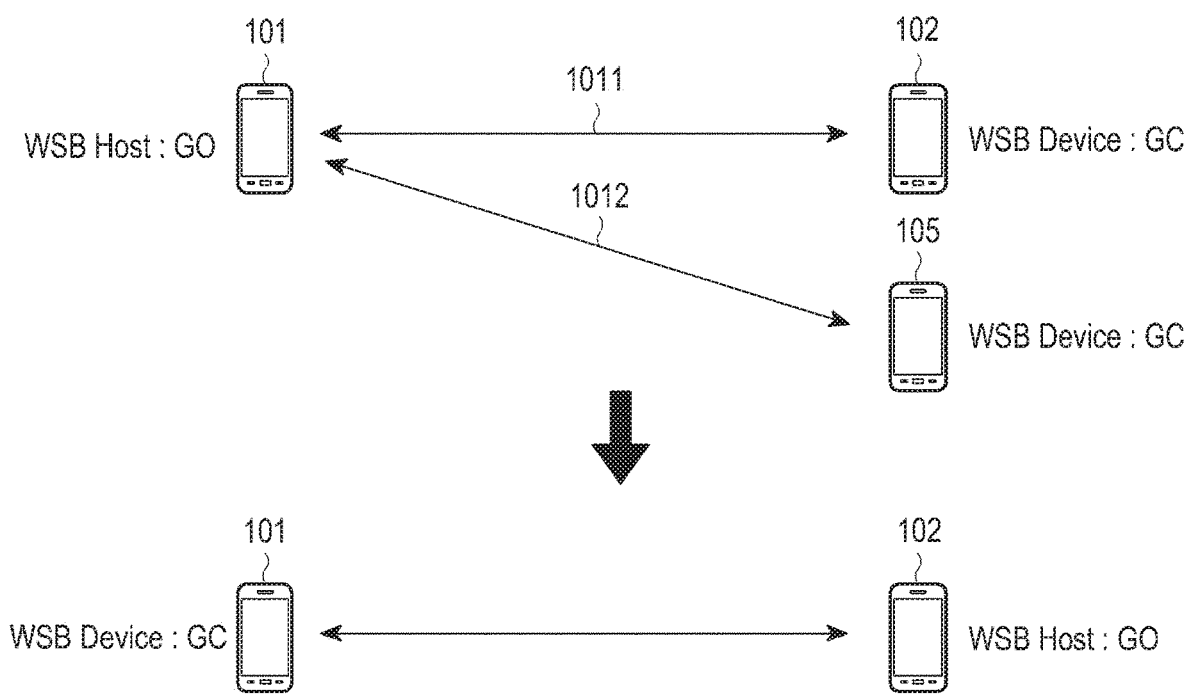
FIG. 10 is a view illustrating an example of resetting a role depending on whether an electronic device is a WSB host according to an embodiment of the disclosure.

FIG. 10 is a view illustrating an example of resetting a role depending on whether an electronic device is a WSB host according to an embodiment of the disclosure.

Referring to FIG. 10, the electronic device 101 may form a Wi-Fi direct connection 1011 with a first external electronic device 102 and a Wi-Fi direct connection 1012 with a second external electronic device 105. According to an embodiment, at least one of the first external electronic device 102 or the second external electronic device 105 may have the same components as the electronic device 101. Alternatively, at least one of the first external electronic device 102 or the second external electronic device 105 may at least partially have the same components as the electronic device 101. For example, at least one of the first external electronic device 102 or the second external electronic device 105 may have the same type as the electronic device 101. At least one of the first external electronic device 102 or the second external electronic device 105 may have a different type from the electronic device 101. The electronic device 101, the first external electronic device 102, and the second external electronic device 105 may form a Wi-Fi direct group. In this case, the electronic device 101 may be set to a WSB host. WSB roles may include a WSB host role and a WSB device role. For example, the WSB host role may be mapped to a wired USB host role, and the WSB device role may be mapped to a USB device role. To take advantage of a WSB service, the electronic device 101 may perform service discovery, peer-to-peer connection setup, and WSB session setup. Once the WSB service is set, the media agnostic universal serial bus (MAUSB) protocol may expand via the internet protocol stack or directly through the media access control layer to transport data about the WSB session through P2P wireless connection. Meanwhile, it may be advantageous that the electronic device 101 playing a role as the WSB host serves as the group owner in the Wi-Fi direct group. Since multiple external electronic devices 102 and 105 may connect to the electronic device 101 playing the WSB host role, the electronic device 101 may advantageously operate as the group owner capable of handling multiple group clients. Accordingly, the WSB host, i.e., the electronic device 101, may operate as the group owner, and the WSB devices, i.e., the external electronic devices 102 and 105, may operate as the group clients. The electronic devices 101, 102, and 105 may manage the Wi-Fi direct group as a persistent group and may thus store information about the persistent group, e.g., the credentials of the electronic devices. The Wi-Fi direct connections 1011 and 1012 may be released.

Thereafter, the electronic device 101 and the first external electronic device 102 may perform reconnection. At the time of reconnection, the first external electronic device 102 may operate as the WSB host. For example, the respective WSB roles of the electronic device 101 and the first external electronic device 102 may be set depending on the characteristics of the application running on each of the electronic device 101 and the first external electronic device 102. Since the first external electronic device 102 operates as the WSB host, the first external electronic device 102 may operate as the group owner upon reconnection. Further, the electronic device 101 may operate as a group client upon reconnection. In other words, the roles in the persistent group of the electronic device 101 and the first external electronic device 102 may differ from the roles of the electronic device 101 and the first external electronic device 102 upon reconnection. Accordingly, the Wi-Fi direct connection 1015 may be formed so that the electronic device 101 plays a role as the group client while the first external electronic device 102 plays a role as the group owner. Resetting the role in the group as per a change in the WSB role is described below in greater detail with reference to FIG. 11.

Figure 11:
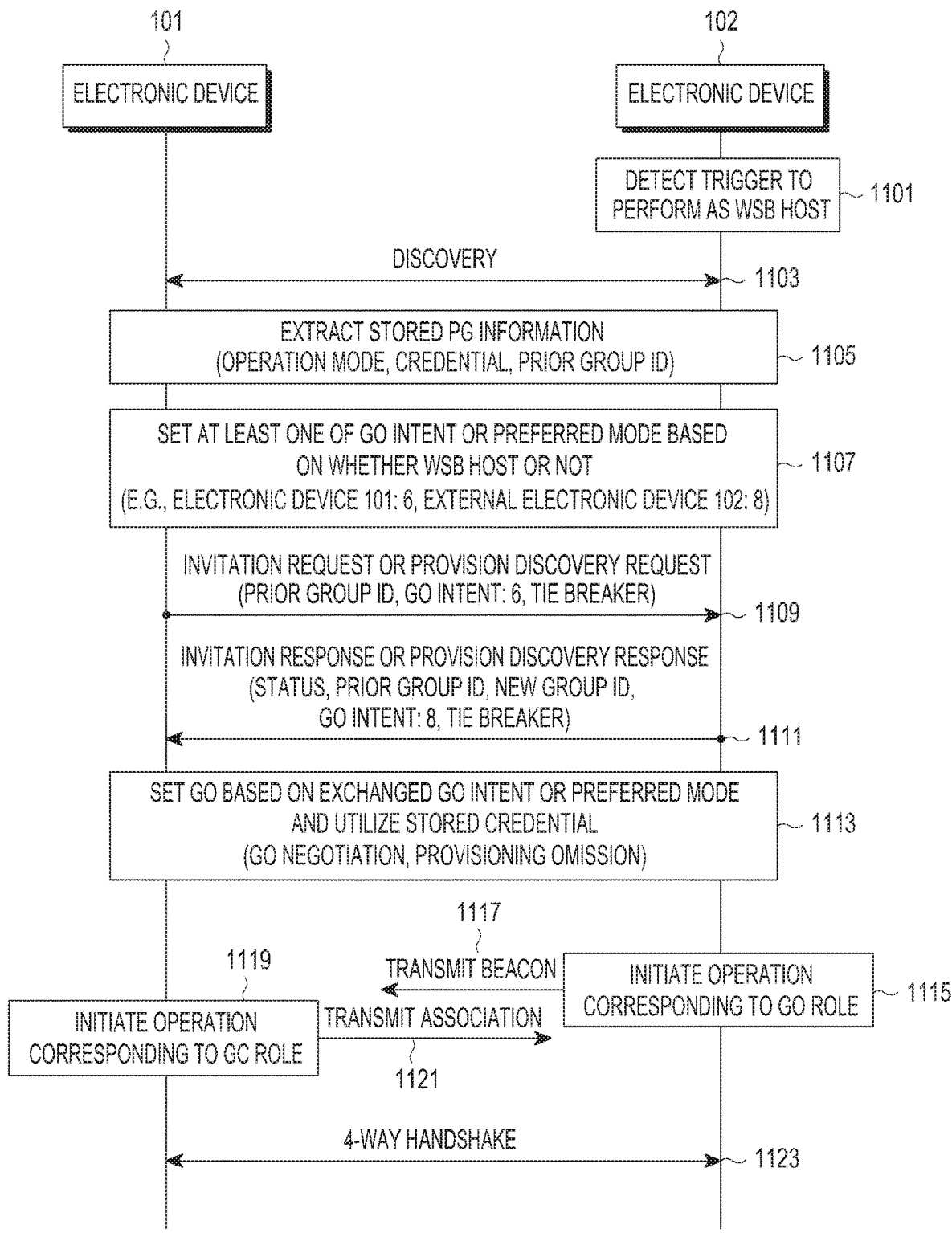
FIG. 11 is a flowchart illustrating operations of electronic devices according to an embodiment of the disclosure.

FIG. 11 is a flowchart illustrating operations of electronic devices according to an embodiment of the disclosure.

According to an embodiment, the electronic device 101 may be used to form a Wi-Fi direct group with the external electronic device 102 while the electronic device 101 and the external electronic device 102 may be used to operate as the group owner and group client, respectively, in the group. The electronic device 101 and the external electronic device 102 may store information about the persistent group. Thereafter, the connection between the electronic device 101 and the external electronic device 102 may be released. In operation 1101, the external electronic device 102 may detect a trigger for operating as the WSB host. For example, the external electronic device 102 may detect the execution of an application to perform the operation of the WSB host.

Referring to FIG. 11, in operation 1103, the electronic device 101 and the external electronic device 102 may perform discovery.

The electronic device 101 and the external electronic device 102 may extract stored persistent group information, e.g. operating mode, credential, and prior group identifier, in operation 1105.

In operation 1107, the electronic device 101 and the external electronic device 102 may set at least one of the GO intent or preferred mode based on whether it is the WSB host. For example, where the electronic device 101 and the external electronic device 102 may be set to the WSB host, the electronic device 101 and the external electronic device 102 may previously set the GO intent to 8. The external electronic device 102 may set its GO intent to 8 as it is set to the WSB host. The electronic device 101 may set its GO intent to 6 based on at least various factors.

In operation 1109, the electronic device 101 may transmit a provision discovery request or invitation request containing the prior group identifier, the GO intent (e.g., 6) of the electronic device 101, and the tie breaker value (e.g., 0) to the external electronic device 102. The electronic device 101 may, e.g., randomly, set the tie breaker value to 0 or 1.

In operation 1111, the external electronic device 102 may transmit an invitation response or provision discovery response containing a status (e.g., failure or success in forming a persistent group), the prior group identifier, a new group identifier, the GO intent (e.g., 8), and the tie breaker of the external electronic device 102.

In operation 1113, the electronic device 101 and the external electronic device 102 may set a new group owner based on the exchanged GO intents or preferred modes and omit GO negotiation and provisioning using the stored credential. For example, the external electronic device 102 which has the higher GO intent may be set to the group owner, and the external electronic device 101 which has the lower GO intent may be set to the group client.

In operation 1115, the external electronic device 102 may initiate an operation corresponding to its new role, i.e., as the group owner. For example, in operation 1117, the external electronic device 102 may transmit a beacon. In operation 1119, the electronic device 101 may initiate an operation corresponding to its new role, i.e., as the group client. For example, in operation 1121, the electronic device 101 may transmit an association corresponding to the received beacon. Or, corresponding to the receipt of the beacon, the electronic device 101 may transmit a first authentication. The external electronic device 102 may transmit a second authentication corresponding to the first authentication, and the electronic device 101 may transmit an association request corresponding to the second authentication.

In operation 1123, the electronic device 101 and the external electronic device 102 may perform a 4-way handshake, forming Wi-Fi direct connection. Alternatively, corresponding to the receipt of the association request, the external electronic device 102 may transmit an association response and then perform a 4-way handshake. Hence, as the external electronic device 102 is set to the WSB host, the external electronic device 102 may change its role from the group client in the persistent group to the group owner. Alternatively, the electronic device 101 and the external electronic device 102 may exchange GO intents using a probe request and a probe response, rather than a provision discovery request and provision discovery response, as set forth above in connection with FIG. 7.

Figure 12A:
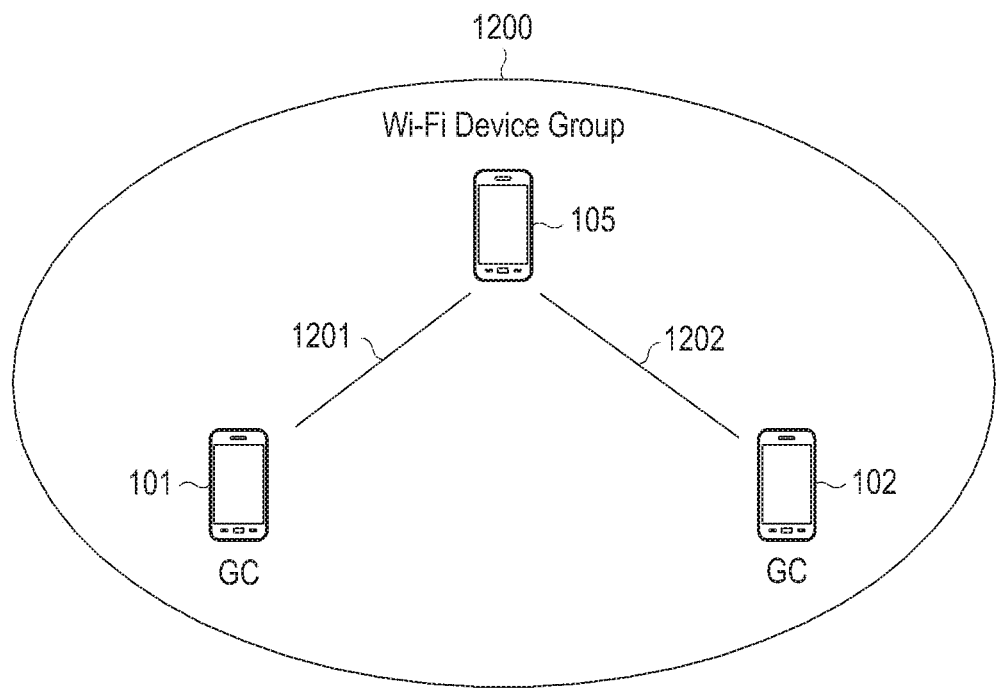
FIGS. 12A and 12B are views illustrating an example of resetting a role between electronic devices which used to be group clients according to various embodiments of the disclosure.
Figure 12B:
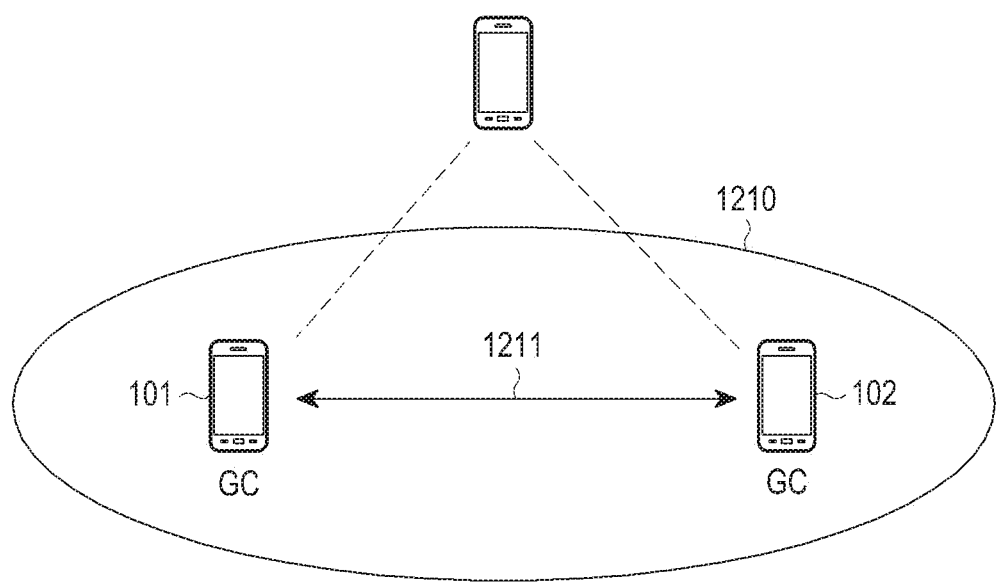

FIGS. 12A and 12B are views illustrating an example of resetting a role between electronic devices which used to be group clients according to an embodiment of the disclosure.

Referring to FIG. 12A, the second external electronic device 105 may form a Wi-Fi direct connection 1201 with the electronic device 101 and a Wi-Fi direct connection 1202 with the second external electronic device 102. The electronic device 101, the first external electronic device 102, and the second external electronic device 105 may form a Wi-Fi direct group 1200. In this case, the second external electronic device 105 may be the group owner, and the electronic device 101 and the first external electronic device 102 may be group clients. The electronic devices 101, 102, and 105 may manage the Wi-Fi direct group 1200 as a persistent group and may thus store information about the persistent group, e.g., the credentials of the electronic devices. The Wi-Fi direct connections 1201 and 1202 may be released.

Thereafter, the electronic device 101 and the first external electronic device 102 may perform reconnection. It is assumed that at the time of reconnection, the second external electronic device 105 which used to be the group owner in the persistent group escapes from the communication coverage of the electronic device 101 or the first external electronic device 102. Thus, only the electronic devices 101 and 102 which used to be group clients in the persistent group may form the Wi-Fi direct group 1210. As per the conventional standard, since the two devices used to be group clients in the persistent group, they cannot use persistent group information and thus cannot reconnect as the persistent group. According to an embodiment, the electronic device 101 may reset the role during the process of forming the Wi-Fi direct connection 1211. By exchanging information (e.g., GO intents) for role setting, the first external electronic device 102 may operate as the group owner of the Wi-Fi direct group 1210, and the electronic device 101 may operate as a group client of the Wi-Fi direct group 1210. In this case, the electronic device 101 and the first external electronic device 102 may perform reconnection using the prior stored information (e.g., credential), enabling quick reconnection.

Figure 13:
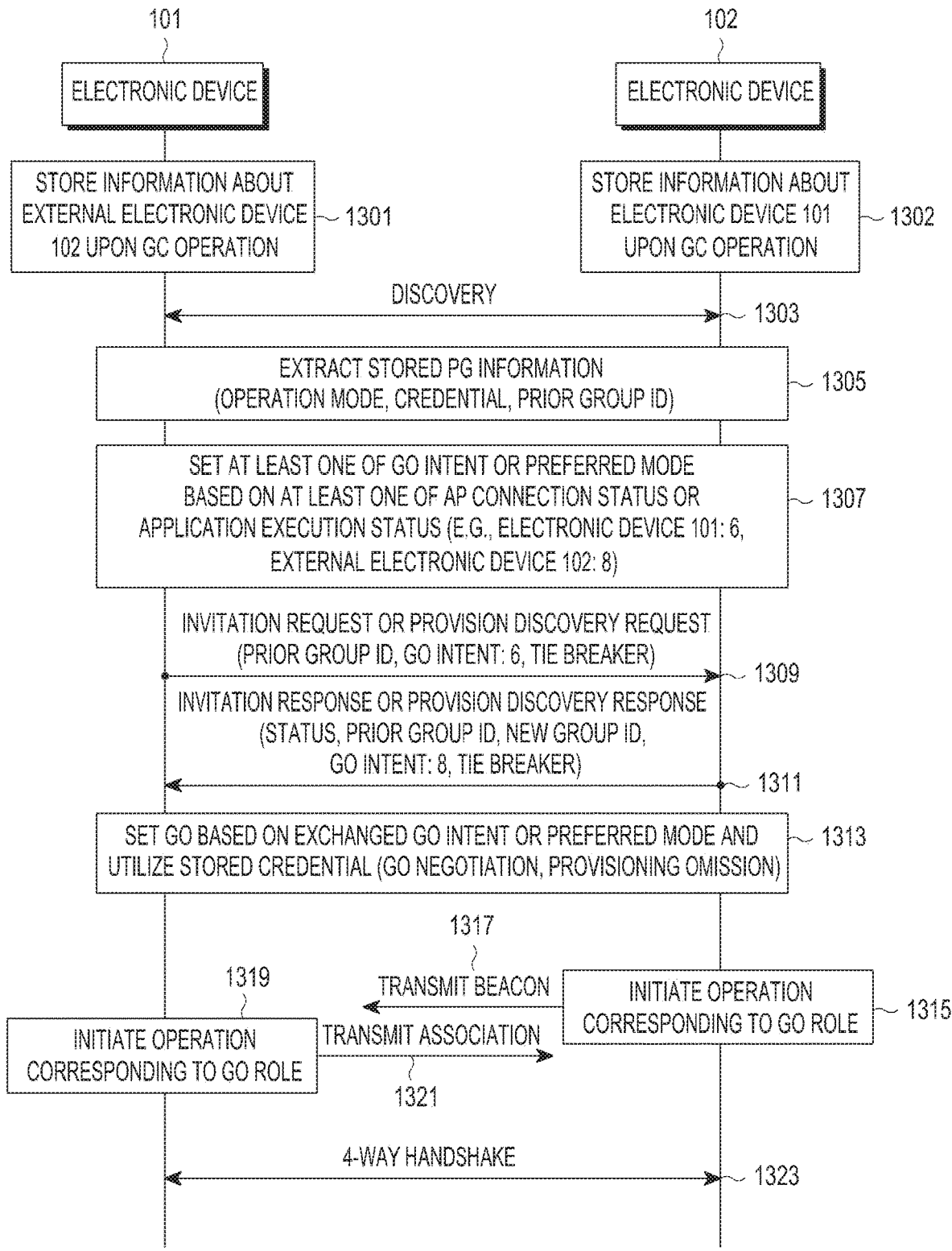
FIG. 13 is a flowchart illustrating operations of electronic devices according to an embodiment of the disclosure.

FIG. 13 is a flowchart illustrating operations of electronic devices according to an embodiment of the disclosure.

According to an embodiment, the electronic device 101 and the external electronic device 102 may be used to form a Wi-Fi direct group with another electronic device while the electronic device 101 and the external electronic device 102 may be used to operate as group clients in the group, and the other electronic device (e.g., the second external electronic device 105 of FIG. 12A) may be used to be the group owner. In operation 1301, the electronic device 101 may store information about the external electronic device 102 upon operating as a group client. According to an embodiment, the electronic device 101 may receive information about the external electronic device 102 from, e.g., the group owner, i.e., the other electronic device. For example, the electronic device 101 may receive the information directly from the external electronic device 102 or via the other electronic device 105. In operation 1302, the external electronic device 102 may store information about the electronic device 101 upon operating as a group client. The external electronic device 102 may also receive the information about the electronic device 101 from the other electronic device. Thereafter, the connection (e.g., Wi-Fi direct group) between the electronic device 101 and the external electronic device 102 may be released.

In operation 1303, the electronic device 101 and the external electronic device 102 may perform discovery.

The electronic device 101 and the external electronic device 102 may extract stored persistent group information, e.g. operating mode, credential, and prior group identifier, in operation 1305.

In operation 1307, the electronic device 101 and the external electronic device 102 may set at least one of the GO intent or preferred mode based on at least one of the AP connection status or application execution status associated with determining the WSB host. For example, where the electronic device 101 and the external electronic device 102 may be set to the WSB host or connect to an AP, the electronic device 101 and the external electronic device 102 may previously set the GO intent to 8. For example, the external electronic device 102 may set its GO intent to 8 as it is set to the WSB host. The electronic device 101 may set its GO intent to 6 based on at least various factors.

In operation 1309, the electronic device 101 may transmit a provision discovery request or invitation request containing the prior group identifier (prior group ID), a first group identifier (new group ID1), the GO intent (e.g., 6) of the electronic device 101, and the tie breaker value (e.g., 0) to the external electronic device 102. The first group identifier (new group ID1) may be a group identifier, e.g., when the electronic device 101 is set to the group owner. Alternatively, the electronic device 101 may transmit the invitation request or provision discovery request containing not the first group identifier but a group identifier related to the persistent group.

In operation 1311, the external electronic device 102 may transmit an invitation response or provision discovery response containing a status (e.g., failure or success in forming a persistent group), the prior group identifier (prior group ID), a second group identifier (new group ID2), the GO intent (e.g., 8), and the tie breaker of the external electronic device 102. The tie breaker of the external electronic device 102 may be set to be different from the tie breaker of the electronic device 101.

In operation 1313, the electronic device 101 and the external electronic device 102 may set a new group owner based on the exchanged GO intents or preferred modes and omit GO negotiation and provisioning using the stored credential. For example, the external electronic device 102 which has the higher GO intent may be set to the group owner, and the external electronic device 101 which has the lower GO intent may be set to the group client.

In operation 1315, the external electronic device 102 may initiate an operation corresponding to its new role, i.e., as the group owner. For example, in operation 1317, the external electronic device 102 may transmit a beacon.

In operation 1319, the electronic device 101 may initiate an operation corresponding to its new role, i.e., as the group client. For example, in operation 1321, the electronic device 101 may transmit an association corresponding to the received beacon. Or, corresponding to the receipt of the beacon, the electronic device 101 may transmit a first authentication. The external electronic device 102 may transmit a second authentication corresponding to the first authentication, and the electronic device 101 may transmit an association request corresponding to the second authentication.

In operation 1323, the electronic device 101 and the external electronic device 102 may perform a 4-way handshake, forming Wi-Fi direct connection. Alternatively, corresponding to the receipt of the association request, the external electronic device 102 may transmit an association response and then perform a 4-way handshake. As set forth above, although both the electronic device 101 and the external electronic device 102 used to be group clients in the persistent group, the electronic device 101 and the external electronic device 102 may reset their roles, forming a Wi-Fi direct connection using information about the persistent group. Alternatively, the electronic device 101 and the external electronic device 102 may exchange GO intents using a probe request and a probe response, rather than a provision discovery request and provision discovery response, as set forth above in connection with FIG. 7.

Figure 14:
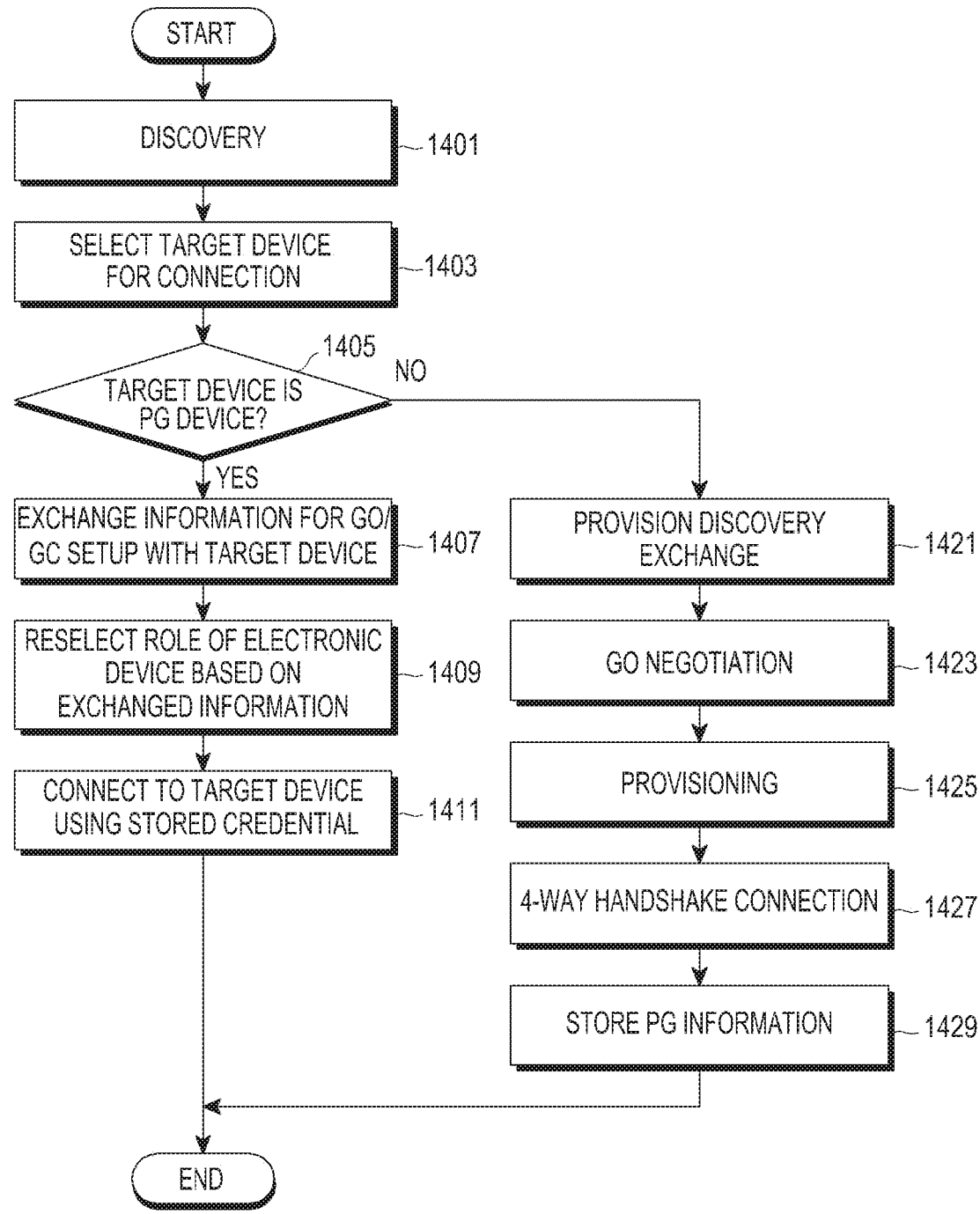
FIG. 14 is a flowchart illustrating a method for operating an electronic device according to an embodiment of the disclosure.

FIG. 14 is a flowchart illustrating a method for operating an electronic device according to an embodiment of the disclosure.

Referring to FIG. 14, in operation 1401, according to an embodiment, the electronic device 101 (or the processor 120) may perform discovery.

In operation 1403, the electronic device 101 may select a target device for connection from among at least one electronic device discovered. For example, the electronic device 101 may select the target device from among at least one electronic device discovered automatically or based on the user's selection. In this case, the electronic device 101 may discovery the results of discovery, and upon detecting the user's input for selecting at least one of the results of discovery, the electronic device 101 may select the target device based on the user's input.

In operation 1405, the electronic device 101 may determine whether the target device for connection is included in the persistent group. The electronic device 101 may determine whether, e.g., information stored as persistent group information includes information about the discovered electronic device.

Where the device used to be in the persistent group, the electronic device 101 may exchange information for setting the role (e.g., as the group owner or group client) in the group with the target device in operation 1407.

In operation 1409, the electronic device 101 may reselect the role of the electronic device based on the exchanged information.

In operation 1411, the electronic device 101 may connect to the target device using the stored credential of the target device in which case it may operate in the reselected role.

Upon determining that the device does not used to be in the persistent group, the electronic device 101 may exchange provision discovery with the target device in operation 1421. In operation 1423, the electronic device 101 may perform group owner negotiation with the target device. The electronic device 101 may perform provisioning with the target device in operation 1425. In operation 1427, the electronic device 101 may perform a 4-way handshake with the target device, forming a Wi-Fi direct connection with the target device. In operation 1429, the electronic device 101 may store information about the persistent group with the target device.

Figure 15:
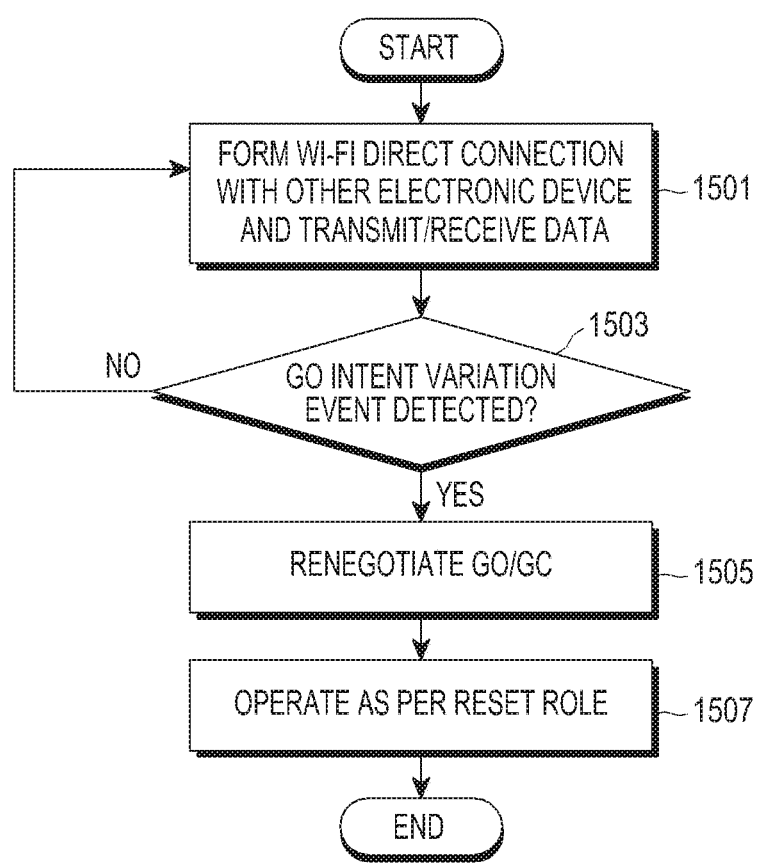
FIG. 15 is a flowchart illustrating a method for operating an electronic device according to an embodiment of the disclosure.

FIG. 15 is a flowchart illustrating a method for operating an electronic device according to an embodiment of the disclosure.

Referring to FIG. 15, in operation 1501, the electronic device 101 (or the processor 120) may form a Wi-Fi direct connection with another electronic device, communicating data with the other electronic device. For example, the electronic device 101 may select group client or group owner as its role, perform a Wi-Fi direct connection procedure, and form a Wi-Fi direct connection.

In operation 1503, the electronic device 101 may determine whether a GO intent variation event is detected after forming the Wi-Fi direct connection. According to an embodiment, the electronic device 101 may determine whether a GO intent variation event is detected based on information about connection to an AP. The electronic device 101 may connect to the AP or release the prior connection with the AP. For example, where the electronic device 101 connects to the AP, the electronic device 101 may detect an event with increasing GO intent (GO intent up event). As another example, where the prior connection with the AP is released, the electronic device 101 may detect an event with decreasing GO intent (GO intent down event). According to an embodiment, the electronic device 101 may determine whether the GO intent variation event is detected based on variations in the WSB role. For example, when the electronic device 101 which used to operate as the WSB host ends the WSB function, the electronic device 101 may detect a GO intent down event. As another example, when the electronic device 101 is set to the WSB host, the electronic device 101 may detect a GO intent up event. According to an embodiment, the electronic device 101 may detect a GO intent up event based on at least state variations in various terminals, such as the battery status, the execution status of various applications, or the AP connection status. The electronic device 101 may transmit a request message for GO re-negotiation containing the GO intent to the other electronic device that the electronic device 101 is being connected with. Corresponding to the receipt of the message, the other electronic device may transmit a message containing the GO intent at the current time to the electronic device 101.

In operation 1505, the electronic device 101 may perform re-negotiation on the group owner with the other electronic device.

In operation 1507, the electronic device 101 may operate as per the reset role. By the above-described process, the electronic device 101 may dynamically reset the role in the group corresponding to an event, such as AP disconnection or setting to the WSB host, even when the Wi-Fi direct group is in connection.

According to an embodiment, the electronic device 101 may include a wireless communication circuit (e.g., the communication module 190), a processor (e.g., the processor 120) electrically connected with the wireless communication circuit, and a memory (e.g., the memory 130) electrically connected with the processor. The memory may store instructions executed to enable the processor to receive, through the wireless communication circuit, a request for connection to a first external electronic device (e.g., the external electronic device 102) among at least one external electronic device discovered, when information about the first external electronic device received during prior connection to the first external electronic device is determined to be stored in the memory, transmit first information for determining a role of the electronic device 101 in a communication group formed between the electronic device 101 and the first external electronic device through the wireless communication circuit to the first external electronic device, receive second information for determining a role of the first external electronic device in the communication group through the wireless communication circuit, determine the role of the electronic device 101 based on at least one of the first information or the second information, and reconnect to the first external electronic device (through the wireless communication circuit based on at least the determined role and the stored information about the first external electronic device.

According to an embodiment, the instructions may enable the processor to transmit a probe request message through the wireless communication circuit and receive a probe response message corresponding to the probe request message from the first external electronic device through the wireless communication circuit.

According to an embodiment, the instructions may enable the processor to determine whether the information about the first external electronic device received during the prior connection to the first external electronic device is stored in the memory by determining whether identification information about the first external electronic device contained in the probe response message is stored in the memory.

According to an embodiment, the instructions may enable the processor to perform control to include the first information in the probe request message and transmit the probe request message through the wireless communication circuit and extract the second information from the probe response message.

According to an embodiment, the instructions may enable the processor to perform control to include a group owner intent of the electronic device 101 and a tie breaker of the electronic device 101, as the first information, in the probe request message and transmit the probe request message through the wireless communication circuit, extract a group owner intent of the first external electronic device and a tie breaker of the first external electronic device, as the second information, from the probe response message, compare the group owner intent of the electronic device 101 with the group owner intent of the first external electronic device, and determine a role of the electronic device 101 based on at least a result of the comparison.

According to an embodiment, the instructions may enable the processor to, when the group owner intent of the electronic device 101 is larger than the group owner intent of the first external electronic device, set the electronic device 101 to a group owner, when the group owner intent of the electronic device 101 is smaller than the group owner intent of the first external electronic device, set the electronic device 101 to a group client, and when the group owner intent of the electronic device 101 is the same as the group owner intent of the first external electronic device, set the electronic device 101 or the first external electronic device which has a tie breaker corresponding to a designated value to the group owner.

According to an embodiment, the instructions may enable the processor to perform control to include the first information in at least one of a provision discovery request message and an invitation request message and transmit the provision discovery request or the invitation request message through the wireless communication circuit and when at least one of a provision discovery response corresponding to the provision discovery request and an invitation response corresponding to the invitation request through the wireless communication circuit is received, extract the second information.

According to an embodiment, the instructions may enable the processor to perform control to include a group owner intent of the electronic device 101 and a tie breaker of the electronic device 101, as the first information, in at least one of the provision discovery request message and the invitation request message and transmit the provision discovery request message or the invitation request message through the wireless communication circuit, extract a group owner intent of the first external electronic device and a tie breaker of the first external electronic device, as the second information, from at least one of the provision discovery response message and the invitation response message, and compare the group owner intent of the electronic device 101 with the group owner intent of the first external electronic device, and determine a role of the electronic device 101 based on at least a result of the comparison.

According to an embodiment, the instructions may enable the processor to, when the group owner intent of the electronic device 101 is larger than the group owner intent of the first external electronic device, set the electronic device 101 to a group owner, when the group owner intent of the electronic device 101 is smaller than the group owner intent of the first external electronic device, set the electronic device 101 to a group client, and when the group owner intent of the electronic device 101 is the same as the group owner intent of the first external electronic device, set the electronic device 101 or the first external electronic device which has a tie breaker corresponding to a designated value to the group owner.

According to an embodiment, the instructions may enable the processor to determine the first information based on at least one of a status of connection of the electronic device 101 to an AP or whether the electronic device 101 is required to operate as a Wi-Fi serial bus (WSB) host.

According to an embodiment, the memory (e.g., the memory 130) may store instructions executed to enable the processor to receive, through the wireless communication circuit, a request for connection to a first external electronic device (e.g., the external electronic device 102) among at least one external electronic device discovered, transmit first information for determining a role of the electronic device 101 in a communication group formed between the electronic device 101 and the first external electronic device through the wireless communication circuit to the first external electronic device, receive second information for determining a role of the first external electronic device in the communication group through the wireless communication circuit, determine the role of the electronic device 101 based on at least one of the first information or the second information, connect to the first external electronic device through the wireless communication circuit based on at least the determined role, upon detecting a variation in the first information while in connection with the first external electronic device, transmit the varied first information through the wireless communication circuit, receive the second information, which is varied or maintained, from the first external electronic device, re-determine the role of the electronic device 101 based on at least one of the varied first information or the varied second information, and operate the electronic device 101 based on at least the predetermined role.

According to an embodiment, a method for operating an electronic device may comprise receiving a request for connection to a first external electronic device among at least one external electronic device discovered, determining whether information about information about the first external electronic device received during the prior connection with the first external electronic device is stored in the electronic device, upon determining that the information about the first external electronic device is stored in the electronic device, transmitting first information for determining a role of the electronic device in a communication group formed between the electronic device and the first external electronic device to the first external electronic device, receiving second information for determining a role of the first external electronic device in the communication group, determining the role of the electronic device based on at least one of the first information or the second information, and reconnecting to the first external electronic device based on at least the determined role and the stored information about the first external electronic device.

According to an embodiment, transmitting the first information to the first external electronic device may include including the first information in a probe request message and transmitting the probe request message, and receiving the second information may include a probe response message containing the second information corresponding to the probe request message.

According to an embodiment, determining whether the information about the first external electronic device is stored in the electronic device may include determining whether the information about the first external electronic device received during the prior connection to the first external electronic device is stored in the electronic device by determining whether identification information about the first external electronic device contained in the probe response message is stored in the electronic device.

According to an embodiment, including the first information in the probe request message and transmitting the probe request message may include including the group owner intent of the electronic device and the tie breaker of the electronic device, as the first information, in the probe request message. In this case, the method for operating the electronic device may further comprise extracting a group owner intent of the first external electronic device and a tie breaker of the first external electronic device, as the second information, from the probe response message. Determining the role of the electronic device based on at least one of the first information or the second information may include comparing the group owner intent of the electronic device with the group owner intent of the first external electronic device and determining the role of the electronic device based on at least a result of the comparison.

According to an embodiment, determining the role of the electronic device may include setting the electronic device to the group owner when the group owner intent of the electronic device is larger than the group owner intent of the first external electronic device, setting the electronic device to the group client when the group owner intent of the electronic device is smaller than the group owner intent of the first external electronic device, and setting the electronic device or the first external electronic device with a tie breaker corresponding to a designated value to the group owner when the group owner intent of the electronic device is the same as the group owner intent of the first external electronic device.

According to an embodiment, transmitting the first information to the first external electronic device may include including the first information in at least one of a provision discovery request message and an invitation request message and transmitting the provision discovery request message or the invitation request message, and receiving the second information may include receiving at least one of a provision discovery response containing the second information corresponding to the provision discovery request and an invitation response containing the second information corresponding to the invitation request.

According to an embodiment, including the first information in at least one of the provision discovery request message and the invitation request message and transmitting the provision discovery request message or the invitation request message may include including the group owner intent of the electronic device and the tie breaker of the electronic device, as the first information, in at least one of the provision discovery request message and the invitation request message. In this case, the method for operating the electronic device may further comprise extracting the group owner intent of the first external electronic device and the tie breaker of the first external electronic device, as the second information, from at least one of the provision discovery response message and the invitation response message. Determining the role of the electronic device based on at least one of the first information or the second information may include comparing the group owner intent of the electronic device with the group owner intent of the first external electronic device and determining the role of the electronic device based on at least a result of the comparison.

According to an embodiment, determining the role of the electronic device may include setting the electronic device to the group owner when the group owner intent of the electronic device is larger than the group owner intent of the first external electronic device, setting the electronic device to the group client when the group owner intent of the electronic device is smaller than the group owner intent of the first external electronic device, and setting the electronic device or the first external electronic device with a tie breaker corresponding to a designated value to the group owner when the group owner intent of the electronic device is the same as the group owner intent of the first external electronic device.

According to an embodiment, the method for operating the electronic device may further comprise determining the first information based on at least one of a status of connection of the electronic device to an AP or whether the electronic device is required to operate as a Wi-Fi serial bus (WSB) host.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment, the electronic device is not limited to the above-listed embodiments.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to various embodiments, there may be provided an electronic device capable of determining a new role in the group while reconnecting to an external electronic device with which the electronic device used to connect and performing the reconnection based on at least part of the new role and prior stored information and a method for operating the electronic device.

According to various embodiments, the electronic device may determine a role in the group based on at least part of current environment information and the prior stored information when performing reconnection with an external electronic device with which the electronic device used to be in connection.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device, comprising:
at least one wireless communication circuit configured to provide wireless communication based on an infrastructure communication protocol and a peer-to-peer (P2P) communication protocol;
at least one processor electrically connected with the at least one wireless communication circuit; and
a memory electrically connected to the at least one processor,
wherein the memory stores instructions executed to enable the at least one processor to:

during first P2P wireless communication with a first external electronic device which allows the electronic device and the first external electronic device to form a group, enable the electronic device to operate as a host or a client, store, in the memory, first information about the group, based on second P2P wireless communication with the first external electronic device being initiated after the first P2P wireless communication, determine whether the first external electronic device used to be in the group based on the first information, and if the first external electronic device is used to be in the group:

include a group owner intent of the electronic device in a provision discovery request message based on a status of the electronic device, transmit the provision discovery request message to the first external electronic device through the wireless communication circuit, and receive a provision discovery response message including a group owner intent of the first external electronic device, compare the group owner intent of the electronic device with the group owner intent of the first external electronic device, and determine a role of the electronic device based on at least a result of the comparison while omitting group owner negotiation defined in the Wi-Fi direct protocol.

2. The electronic device of claim 1, wherein the infrastructure communication protocol includes a Wi-Fi protocol or institute of electrical and electronics engineers (IEEE) 802.11, and wherein the P2P communication protocol includes a Wi-Fi direct protocol.

3. The electronic device of claim 2, wherein the group is a persistent group defined in the Wi-Fi direct protocol.

4. The electronic device of claim 2, wherein the host is a group owner defined in the Wi-Fi direct protocol, and wherein the client is a group client defined in the Wi-Fi direct protocol.

5. The electronic device of claim 4, wherein the instructions further enable the at least one processor to:

transmit a message to the first external electronic device, wherein the message includes a vendor specific information element (VSIE) including a group identifier.

6. The electronic device of claim 5, wherein the VSIE further includes a number indicating intent to become the group owner.

7. The electronic device of claim 6, wherein the VSIE further includes a tie breaker bit.

8. The electronic device of claim 1, wherein the instructions further enable the at least one processor to:

based on the electronic device being connecting with an external access point (AP) which is different from the first external electronic device, include a first value as the group owner intent of the electronic device in the provision discovery request message, and based on the electronic device being not connecting with an external access point (AP) which is different from the first external electronic device, include a second value as the group owner intent of the electronic device in the provision discovery request message, and wherein the first value is larger than the second value.

9. The electronic device of claim 1, wherein the status of the electronic device further includes a status of the electronic device regarding execution of at least one application.

10. An electronic device, comprising:

a wireless communication circuit;

at least one processor electrically connected with the communication circuit; and a memory electrically connected to the at least one processor, wherein the memory stores instructions executed to enable the at least one processor to:

receive, through the wireless communication circuit, a request for connection to a first external electronic device among at least one external electronic device discovered, when information about the first external electronic device received during a prior connection to the first external electronic device is determined to be stored in the memory, transmit first information for determining a role of the electronic device in a communication group formed between the electronic device and the first external electronic device through the wireless communication circuit to the first external electronic device, receive second information for determining a role of the first external electronic device in the communication group through the wireless communication circuit, determine the role of the electronic device based on at least one of the first information or the second information, reconnect to the first external electronic device through the wireless communication circuit based on at least the determined role and the stored information about the first external electronic device, include a group owner intent of the electronic device, as the first information, in a provision discovery request message based on a status of the electronic device, transmit the provision discovery request message to the first external electronic device through the wireless communication circuit, receive a provision discovery response message including a group owner intent of the first external electronic device as the second information, compare the group owner intent of the electronic device with the group owner intent of the first external electronic device, and determine a role of the electronic device based on at least a result of the comparison while omitting group owner negotiation defined in the Wi-Fi direct protocol.

11. The electronic device of claim 10, wherein the instructions further enable the at least one processor to:

transmit a probe request message through the wireless communication circuit and receive a probe response message corresponding to the probe request message from the first external electronic device through the wireless communication circuit.

12. The electronic device of claim 11, wherein the instructions further enable the at least one processor to:

determine whether the information about the first external electronic device received during the prior connection to the first external electronic device is stored in the memory by determining whether identification information about the first external electronic device contained in the probe response message is stored in the memory.

13. The electronic device of claim 11, wherein the instructions further enable the at least one processor to:
- include the first information in the probe request message,
- transmit the probe request message through the wireless communication circuit, and
- extract the second information from the probe response message.

14. The electronic device of claim 13, wherein the instructions enable the at least one processor to:
- include a group owner intent of the electronic device and a tie breaker of the electronic device, as the first information, in the probe request message,
- transmit the probe request message through the wireless communication circuit,
- extract a group owner intent of the first external electronic device and a tie breaker of the first external electronic device, as the second information, from the probe response message,
- compare the group owner intent of the electronic device with the group owner intent of the first external electronic device, and
- determine a role of the electronic device based on at least a result of the comparison.

15. The electronic device of claim 10, wherein the instructions further enable the at least one processor to:
- when the group owner intent of the electronic device is larger than the group owner intent of the first external electronic device, set the electronic device to a group owner,
- when the group owner intent of the electronic device is smaller than the group owner intent of the first external electronic device, set the electronic device to a group client, and
- when the group owner intent of the electronic device is the same as the group owner intent of the first external electronic device, set the electronic device or the first external electronic device which has a tie breaker corresponding to a designated value to the group owner.

16. The electronic device of claim 10, wherein the instructions further enable the at least one processor to:
- determine the first information based on at least one of a status of connection of the electronic device to an AP or whether the electronic device is required to operate as a Wi-Fi serial bus (WSB) host.

\* \* \* \* \*